(12) United States Patent
Ahn et al.

(10) Patent No.: US 7,858,197 B2
(45) Date of Patent: Dec. 28, 2010

(54) COMPOSITION HAVING IMPROVED ADHERENCE WITH AN ADDITION-CURABLE MATERIAL AND COMPOSITE ARTICLE INCORPORATING THE COMPOSITION

(75) Inventors: Dongchan Ahn, Midland, MI (US); Nick Evan Shepard, Midland, MI (US); Harold Christian Fowler, Midland, MI (US); Kevin Louis Nichols, Freeland, MI (US); John Matthew Warakomski, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 666 days.

(21) Appl. No.: 10/585,844

(22) PCT Filed: Jan. 21, 2005

(86) PCT No.: PCT/US2005/002030

§ 371 (c)(1),
(2), (4) Date: Dec. 28, 2007

(87) PCT Pub. No.: WO2005/071006

PCT Pub. Date: Aug. 4, 2005

(65) Prior Publication Data

US 2008/0177000 A1 Jul. 24, 2008

Related U.S. Application Data

(60) Provisional application No. 60/538,186, filed on Jan. 22, 2004.

(51) Int. Cl.
*B32B 29/00* (2006.01)
*C08G 77/24* (2006.01)

(52) U.S. Cl. ................... 428/447; 428/448; 528/42
(58) Field of Classification Search ................. 525/102
See application file for complete search history.

(56) References Cited

U.S. PATENT DOCUMENTS

| 2,676,182 | A | | 4/1954 | Daudt et al. |
| 2,934,515 | A | * | 4/1960 | Konkle et al. ............... 525/102 |
| 3,159,601 | A | | 12/1964 | Ashby |
| 3,220,972 | A | | 11/1965 | Lamoreaux |
| 3,296,191 | A | | 1/1967 | Chalk et al. |
| 3,419,593 | A | | 12/1968 | Willing |
| 3,485,706 | A | | 12/1969 | Evans |
| 3,516,946 | A | | 6/1970 | Modic |
| 3,715,411 | A | * | 2/1973 | Day et al. ............... 525/102 |
| 3,814,730 | A | | 6/1974 | Karstedt |
| 3,840,618 | A | * | 10/1974 | Da Fano ............... 525/14 |
| 3,989,668 | A | | 11/1976 | Lee et al. |
| 4,028,431 | A | * | 6/1977 | Futami et al. ............... 525/104 |
| 4,220,342 | A | * | 9/1980 | Shah ............... 277/654 |
| 4,322,027 | A | | 3/1982 | Reba |
| 4,340,563 | A | | 7/1982 | Appel et al. |
| 4,370,358 | A | | 1/1983 | Hayes et al. |
| 4,413,110 | A | | 11/1983 | Kavesh et al. |
| 4,584,355 | A | | 4/1986 | Blizzard et al. |
| 4,585,836 | A | | 4/1986 | Homan et al. |
| 4,591,622 | A | | 5/1986 | Blizzard et al. |
| 4,661,577 | A | * | 4/1987 | Jo Lane et al. ............... 528/10 |
| 4,663,220 | A | | 5/1987 | Wisneski et al. |
| 4,668,566 | A | | 5/1987 | Braun |
| 4,707,531 | A | | 11/1987 | Shirahata |
| 4,766,176 | A | | 8/1988 | Lee et al. |
| 4,784,879 | A | | 11/1988 | Lee et al. |
| 5,017,654 | A | | 5/1991 | Togashi et al. |
| 5,036,117 | A | | 7/1991 | Chung et al. |
| 5,158,708 | A | * | 10/1992 | Yamamoto et al. ............... 252/512 |
| 5,175,325 | A | | 12/1992 | Brown et al. |
| 5,310,843 | A | | 5/1994 | Morita |

(Continued)

FOREIGN PATENT DOCUMENTS

EP        0143994 B1    6/1985

(Continued)

OTHER PUBLICATIONS

Emel Yilgor et al., "Influence Of Sample Preparation Method On Surface Microstructure And Properties Of Nylon-6 Siloxand-Urea CoPolymer Blends", Polymer Preprints, 39(2), (1998) pp. 1171-1172.

(Continued)

*Primary Examiner*—Randy Gulakowski
*Assistant Examiner*—Robert Loewe
(74) *Attorney, Agent, or Firm*—Howard & Howard Attorneys PLLC

(57) ABSTRACT

A composition and composite article have improved adherence with an addition-curable material. The composition and therefore the composite article, which includes at least one substrate formed from the composition, include a resin and an additive that is incorporated into the resin. The resin is organic and polymeric and free of ethylenically unsaturated and silicon hydride functional groups. The additive is selected from the group of a fluorine-substituted organopolysiloxane, an amino-functional organopolysiloxane, an unsaturated carboxylic acid or carboxylic acid salt, and combinations thereof. Further, the additive includes a hydrosilylation reactive group present at a surface of the substrate for reaction with the addition-curable material. This improves adherence of the substrate with the addition-curable material. The substrate and the addition-curable material bond together to make the composition article.

34 Claims, No Drawings

U.S. PATENT DOCUMENTS

| | | | |
|---|---|---|---|
| 5,366,805 A | | 11/1994 | Fujiki et al. |
| 5,368,315 A | * | 11/1994 | Viksne ....................... 277/592 |
| 5,457,158 A | * | 10/1995 | Caporiccio et al. .......... 525/102 |
| 5,468,324 A | | 11/1995 | Hong |
| 5,635,114 A | | 6/1997 | Hong |
| 5,654,366 A | * | 8/1997 | Furukawa et al. ........... 525/101 |
| 5,663,016 A | | 9/1997 | Hong |
| 5,681,914 A | * | 10/1997 | Kobayashi et al. ............. 528/18 |
| 5,708,084 A | * | 1/1998 | Hauenstein et al. ......... 525/102 |
| 5,792,812 A | | 8/1998 | Fujiki et al. |
| 5,879,809 A | | 3/1999 | Muramatsu et al. |
| 5,989,704 A | | 11/1999 | Hashimoto et al. |
| 6,143,423 A | * | 11/2000 | Shiobara et al. ............. 428/620 |
| 6,153,691 A | * | 11/2000 | Gornowicz et al. ......... 524/861 |
| 6,265,515 B1 | * | 7/2001 | Mera et al. ..................... 528/25 |
| 6,329,451 B2 | * | 12/2001 | Matsumoto et al. ........... 524/80 |
| 6,417,271 B1 | * | 7/2002 | Nishihara et al. ........... 525/105 |
| 6,447,913 B1 | * | 9/2002 | Watanabe et al. ........... 428/413 |
| 6,482,888 B1 | | 11/2002 | Ahn et al. |
| 6,509,423 B1 | | 1/2003 | Zhu |
| 6,541,548 B2 | * | 4/2003 | Weidner et al. ............. 524/108 |
| 6,824,848 B2 | * | 11/2004 | Dhaler et al. .............. 428/40.1 |
| 2002/0006998 A1 | * | 1/2002 | Furukawa et al. ........... 524/445 |
| 2003/0013802 A1 | * | 1/2003 | Ahn et al. ................... 524/588 |
| 2004/0259965 A1 | * | 12/2004 | Higuchi et al. ................. 521/82 |

FOREIGN PATENT DOCUMENTS

| | | |
|---|---|---|
| EP | 0540259 B1 | 5/1993 |
| EP | 0601881 B1 | 6/1994 |
| EP | 0845500 B1 | 6/1998 |
| EP | 0347895 A2 | 11/1999 |
| EP | 0969048 B1 | 1/2000 |

OTHER PUBLICATIONS

M. Maric et al., "Reactive Blending of Poly(dimethylsiloxane) With Nylon 6 and Poly(styrene): Effect of Reactivity on Morphology", Polymer Engineering and Science, Apr. 2001, vol. 41. No. 4, pp. 631-642.

U. Mukai, et al., "Microechanical Testing of Toughness in Nylon 6/PDMS Block Copolymers and Blends", Polymer Engineering and Science, Mar. 1996, vol. 36, No. 6, pp. 895-897.

Plastics Engineering Handbook of the Society of the Plastics Industry, Inc., Fourth Edition, 1976, pp. 47, 83, 156, 174, 180, 183, 185, 191, 326, 348, and 357.

* cited by examiner

COMPOSITION HAVING IMPROVED ADHERENCE WITH AN ADDITION-CURABLE MATERIAL AND COMPOSITE ARTICLE INCORPORATING THE COMPOSITION

RELATED APPLICATIONS

This application claims priority to and all the advantages of International Patent Application No. PCT/US2005/002030, filed on Jan. 21, 2005, which claims priority to United States Provisional Patent Application No. 60/538,186, filed on Jan. 22, 2004.

BACKGROUND OF THE INVENTION

1. Field of the Invention

The subject invention generally relates to a composition that has improved adherence with an addition-curable material. The subject invention also generally relates to a composite article that includes the addition-curable material and at least one substrate that is formed from the composition. The composition includes a resin component and an additive for reaction with the addition-curable material.

2. Description of the Related Art

Addition-curable materials and their uses are known in the art. It is desirable to use addition-curable materials because volatile byproducts are not generated during reactions to cure these materials. One example of an addition-curable material is a silicone-based elastomer that cross-links, upon cure, by hydrosilylation. Such materials are used, for example, in the automotive components industry for sealing or adhering various components together. During curing, the silicone-based elastomer also physically— and/or chemically-interacts with the chemical makeup of the various components to adhere or bond the components together. Frequently, the various components are typically formed from a polymeric composition. It is known that the interactions between the silicone-based elastomer and the polymeric compositions that make up the components are weak. As a result, the times and temperatures required to ensure adequate interaction between the elastomer and the polymeric composition are significantly higher than those required to cure the silicone-based elastomer. Often, it is preferred that the predominant interaction be chemical in nature to ensure durability of the bonded composite. However, even with extremely long cure times and/or extremely high cure temperatures, the chemical interaction between the silicone-based elastomer and certain polymeric compositions is not sufficient because there is no reactive chemical functionality present in these particular polymeric compositions for the addition-curable material, i.e., the silicone-based elastomer, to react with. Because there is no reactive chemical functionality present in the particular polymeric compositions, there is no reactive chemical functionality present at the surfaces of the components. As a result, the adhesion between silicone-based elastomer and the components is inadequate.

Furthermore, due to the high temperatures needed to develop adhesion with addition-curable materials, outgassing of entrained volatile materials, such as water from the polymeric compositions, leads to formation of undesirable voids or bubbles in the joint between the silicone-based elastomer and the substrate or substrates. This problem is particularly acute with hygroscopic, polar polymeric compositions such as polyesters, polyamides, polyimides, and epoxy resins. To overcome this limitation, the components often need to be pre-dried, requiring additional process steps and drying equipment in a manufacturing process.

In the art, there are many examples of external treatment methods for the surfaces of the components, such as application of a primer or exposure to high energy sources such as plasma, corona, or ultraviolet light. However, such treatment methods require additional processing time and/or costly equipment in the manufacturing process.

Due to the deficiencies associated with the silicone-based elastomers and polymeric materials of the prior art, including those described above, it would be desirable to provide a composition that has improved adherence with an addition-curable material, such as a silicone-based elastomer, while eliminating the need for pre-drying and external treatment methods of the surfaces of the components.

SUMMARY OF THE INVENTION AND ADVANTAGES

A composition and a composite article that incorporates the composition are disclosed. The composition has improved adherence with an addition-curable material, such as a silicone-based elastomer. The composition includes a resin component and an additive that is incorporated into the resin component. The additive includes a hydrosilylation reactive group for reaction with the addition-curable material.

The composite article includes at least one substrate. The composite article further includes the addition-curable material. In the composite article, the addition-curable material is disposed on the substrate. The substrate is formed from the composition including the resin component and the additive. The hydrosilylation reactive group of the additive is present at a surface of the substrate to improve adherence of the substrate with the addition-curable material.

Accordingly, the subject invention provides a composition that has improved adherence with an addition-curable material such as a silicone-based elastomer. It is particularly advantageous that the improved adherence is accomplished without reformulating the chemical composition of the addition-curable material. Energy savings and reduced cycle times can be realized when adhering this composition to the addition-curable material to make fully bonded composite articles that that can be prepared at substantially lower temperatures and/or shorter times. Furthermore, the need for pre-drying of the substrate and/or the need for curing ovens can be obviated in view of the composition of the present invention. The additive can also improve release characteristics of the composition from surfaces of equipment, such as extruders and injection molding apparatuses, used when manufacturing and/or processing the composition.

DETAILED DESCRIPTION OF THE INVENTION

A composition according to the present invention has improved adherence with an addition-curable material. As described additionally below, the composition is incorporated into a composite article that includes at least one substrate in combination with the addition-curable material. The at least one substrate is formed from the composition, and the addition-curable material, such as a silicone-based elastomer, is disposed on the at least one substrate. Once the addition-curable material is disposed on the at least one substrate, the addition-curable material and the at least one substrate are cured and bonded together at significantly lower temperatures to make the composite article.

In one preferred embodiment, the at least one substrate includes a first substrate and a second substrate and the remaining description may refer to this preferred embodiment. Either the first or second substrate, or both the first and second substrate, are formed from the composition, and the addition-curable material, such as the silicone-based elastomer, is disposed between the first and second substrates for adhering these substrates together at an interface. In another preferred embodiment, the at least one substrate includes just the first substrate and the addition-curable material is disposed over the first substrate to form a protective coating. Alternatively, the at least one substrate is one substrate formed from the composition on which other substrates and/or components, which are not necessarily formed from the composition of the subject composition, are supported or mounted on the substrate, and the addition-curable material is disposed over all of the substrates and/or components to form a protective coating, as exemplified by an electronic circuit board encapsulated by an addition-curable silicone gel.

The composition includes a resin component and an additive that is incorporated into the resin component. The additive can be incorporated into the resin component during polymerization reactions for preparing the resin component. Alternatively, the additive can be incorporated into the resin component during finishing steps associated with the polymerization reactions for preparing the resin component. Alternatively, the additive is incorporated into the resin component during a post-polymerization compounding operation. The additive is described additionally below.

The resin component is chosen depending on the application for the composite article and is generally selected from the group consisting of thermosetting resins, thermoplastic resins, and mixtures thereof. The resin component can be monomeric, oligomeric, polymeric, or include a mixture of monomers and/or oligomers and/or polymers. Suitable monomers or oligomers can be any monomers or oligomers used to make addition or condensation polymers, or monomers used in any other type of polymerization reaction. Examples of monomers or oligomers for the resin component include, but are not limited to, terephthalic acid, acrylic acid, mono- and multi-functional acrylates and methacrylates, styrene, all types of substituted styrene, maleic acid, fumaric acid, maleic anhydride, siloxanes, silanes, epoxies, and urethanes. It is understood that the monomers and oligomers are polymerized, copolymerized or otherwise reacted during processing of the composition such that the resin component, which is formed from the monomers and oligomers, is substantially free of ethylenically unsaturated functional groups and silicon hydride functional groups. For example, siloxanes and silanes can be part of the resin component for toughening or coupling agents or even other purposes, but they are clearly differentiated from the additive in that, in the resin component, they cannot have the ethylenically unsaturated or silicon hydride functional groups remaining.

As alluded to above, the resin component is free of ethylenic unsaturation and silicon hydride functional groups. Furthermore, in the preferred embodiment, the resin component is polymeric and is either thermoset or thermoplastic. Examples of suitable polymeric thermoset resins for the resin component include, but are not limited to, those commonly known in the art, such as natural rubbers, crosslinked synthetic rubbers such as polyisoprene, polybutadiene, neoprene, acryl, silicone and ester rubbers, thermosetting fluoroelastomers such as those made by crosslinking polymerized vinyl compounds such as hexafluoropropylene, vinylidene fluoride, tetrafluoroethylene, chlorotrifluoroethylene, and copolymers thereof (e.g. those manufactured under the tradename of Viton®), or by crosslinking polymerized alkyl acrylates and/or alkyl methacrylates (hereinafter referred to as "allyl acrylate" monomers or simply "alkyl acrylates"), such as hexafluorobutyl methacrylate, and hexafluorobutyl acrylate. Other examples of suitable polymeric thermoset resins include polyurethanes, epoxy resins, phenoxy resins, cyanate esters, polyimides, phenolic resins, polyphenol-formaldehyde, polymelamine-formaldehyde, polyurea-formaldehyde, bis-maleimide triazine, and crosslinked versions of poly(n-alkyl acrylates), polyesters, polyolefins, polystyrenes, polyvinyl chlorides, vinyl esters and polyamides.

Examples of suitable polymeric thermoplastic resins for the resin component include, but are not limited to, styrene-based polymers such as polystyrene (including atactic, syndiotactic and isotactic polystyrene), halogen-substituted styrene polymers, styrene acrylonitrile copolymers, acrylonitrile-butadiene-styrene (ABS) resins, styrene-butadiene copolymers, styrene-butadiene-styrene (SBS) block copolymers, blends of styrene-acrylonitrile copolymer and ethylene-styrene interpolymer, polycarbonate/acrylonitrile-butadiene-styrene terpolymer alloys, and SEBS resins, polyacrylonitrile, condensation polymers such as polyesters including polyethylene terephthalate, polybutylene terephthalate (PBT), polyarylate, and the like, polycarbonates (including impact-modified polycarbonate), polyethers such as polyphenyleneoxide, maleic anhydride grafted polyphenyleneoxide, maleic anhydride grafted olefinic elastomers and plastomers, polysulfone, polyethersulfone, polyarylsulfone, polyphenylene ether, and the like, condensed polymers such as polyamide (6, 6/6, 6/10, 6/12, 11 or 12, and the like) and polyoxymethylene, polyphenylenesulfide (PPS), acryl-based polymers such as polyacrylic acid, poly(n-butyl methacrylate), poly(n-butyl acrylate), and polymethyl methacrylate, halogen-substituted acrylates such as hexafluorobutyl methacrylate and hexafluorobutyl acrylate polyacrylamides, polyolefins such as polyethylene (low density polyethylene (LDPE), medium and high density polyethylene, linear low density polyethylene (LLDPE), high density polyethylene (HDPE), and the like), polypropylene (including isotactic polypropylene and blends of isotactic polypropylene and syndiotactic polypropylene) blends of isotactic polypropylene and polyethylene, polybutene, poly(4-methylpentene-1), ethylene-propylene copolymers, poly(ethylene/1-butylene), poly(propylene/1-butylene), poly(ethylene/propylene/1-butylene), poly(ethylene butyrate), and poly(polyethylene naphthalate), halogen substituted vinyl polymers such as polyhexafluoropropylene, polytetrafluoroethylene, polyvinylidene fluoride, polyvinyl chloride, polyvinylidene chloride, polyvinyl fluoride, polyvinylidene dichloride, vinylidene chloride-vinyl chloride copolymers, vinylidene chloride-methylacrylate copolymers, and the like, polyvinylmethylether, other vinyl containing compounds such as ethylene-vinyl alcohol polymers and polyvinyl alcohols, ethylene vinyl acetate, and other vinyl containing compounds having an epoxy group, such as glycidyl methacrylate, glycidyl acrylate, vinyl glycidyl ether, glycidyl ether of hydroxyalkyl(meth)acrylate, glycidyl ether of polyalkyleneglycol (meth)acrylate, and glycidylitaconate, among which glycidyl methacrylate is particularly preferred. Also included for example are copolymers of styrene and substituted styrene (e.g., styrene/p-methylstyrene copolymers. These copolymers can be atactic, isotactic, or syndiotactic.

Further examples of potential thermoplastic resins include polyacetals, polyamide-imides, polypthalamides, polyetherimides, polyformaldehydes such as Delrin®, polyethyleneimine, poly-N-vinylcarbazole, polytetrafluoroethylene, fluorinated ethylene propylene, perfluoroalkoxy, polychlorotrifluoroethylene, ethylene tetrafluoroethylene, polyetherketone, polyether etherketone, polyether ketone ether ketone, polyoxymethylene(acetal) homopolymer copolymers, polyester urethane, polyether urethane, ethylene/vinyl acetate copolymer, copolymers of ethylene or propylene with other alpha-olefins, copolymers of acrylonitrile-butadiene-styrene (ABS), copolymers of acrylonitrile and styrene impact-modified with ethylene-propylene rubber or ethylene/propylene/alpha-olefin rubber or butyl acrylate rubber, blends of ABS and polycarbonate, blends of ABS and polyvinyl chloride (PVC), PVC, copolymers of styrene and butadiene, copolymer of styrene and butadiene that also contains ethylene-propylene rubber or ethylene/propylene/alpha-olefin rubber or butyl acrylate rubber, thermoplastic elastomer, or thermoplastic vulcanizate, polylactide, polyphenylene oxide, amorphous glassy polymers, preferably of cellulose acetate, cycloolefin copolymers such as Topaz® manufactured by Ticona, polymethyl methacrylate, glycol-modified polyester, blends of glycol-modified polyester, optionally amorphous co-polyester, maleic anhydride grafted ethylene-methyl acrylate copolymer, ethylene-methyl acrylate-glycidyl methacrylate copolymer, maleic anhydride functionalized styrene-ethylene-butene block copolymer, styrene-isoprene-styrene block copolymer, amorphous thermoplastic polyester resins having a glass transition temperature (Tg) of above 50° C., amorphous polyamide or copolymer polyamide having a Tg of above 120° C., glycol-modified polyester, amorphous polyurethanes or their blends with at least 60 wt. % of glycol-modified polyester, and impact-modified poly(methyl methacrylate).

Yet a further example of a potential thermoplastic resin includes one or more copolymers selected from a-b type block copolymers, a-b-a type block copolymers, b-a-b type block copolymers, a grafted b copolymers and b grafted a copolymers, where a is a non-reactive block with a glass transition temperature or melting transition temperature higher than that of a rubbery b block. In the art, many such block copolymers and blends thereof are known as thermoplastic elastomers. As portion a of the a-b, a-b-a or b-a-b type block copolymer, examples include atactic polystyrene, polymethylmethacrylate. As portion b, one or more polymers or copolymers selected from conjugated diene, hydrogenated product of conjugated diene, conjugated diene modified with acid anhydride, hydrogenated product of conjugated diene modified with acid anhydride, organopolysiloxane and polyalkylacrylate can be given along with their halogenated and partially halogenated homologs. Examples of portion b include polymers and copolymers of isoprene, butadiene, hydrogenated butadiene, hydrogenated isoprene, dimethylsiloxane, butadiene modified with maleic anhydride, hydrogenated product of butadiene modified with maleic anhydride, isoprene modified with maleic anhydride, hydrogenated product of isoprene modified with maleic anhydride, phenylmethylsiloxane, methyl-3,3,3-trifluoropropylsiloxane, n-butyl acrylate, 2-ethylhexyl acrylate, 2-ethylhexyl methacrylate, and 1H,1H,3H-tetrafluoropropylacrylate.

Graft copolymers which can be used are indicated in terms of a grafted b copolymers or b grafted a copolymers. Examples are a styrene-butadiene block copolymer rubber (SB, SBS, BSB), rubbers obtained by partially or completely hydrogenating the butadiene portion of a styrene-butadiene block copolymer (SEBS, SEB), a styrene-isoprene block copolymer rubber (SI, SIS, ISI), rubbers obtained by partially or completely hydrogenating the isoprene portion of a styrene-isoprene block copolymer (SEP, SEPS), SBS modified with maleic anhydride, SEBS modified with maleic anhydride, SEP modified with maleic anhydride and SIS modified with maleic anhydride.

Other elastomers include; an AABS elastomer, obtained by adding acrylonitrile and styrene to a rubber latex which has been obtained by copolymerizing butadiene and alkyl acrylate, and then graft polymerizing them, and a SBR elastomer (trade name: Metablen IP-2, produced by Mitsubishi Rayon Co., Ltd.), obtained by graft polymerizing styrene to polybutadiene. These rubber-like polymers are core shell type rubbers.

The resin component can also include other copolymers or polymeric alloys, which are defined as two or more miscible or partially miscible polymers, and polymeric blends, which are defined as having discrete non-miscible phases. Specific examples of alloys blends include ABS/polyamide, polystyrene/polyphenylene oxide, polycarbonate/ABS, ABS/polyvinylchloride, polyphenylene ether/polystyrene, polyphenylene ether/polyamide, syndiotactic polystyrene/polyamide, polysulfone/ABS, polycarbonate/thermoplastic urethane, polycarbonate/polyethylene terephthalate, thermoplastic elastomer alloys, polyamide/elastomers, polyester/elastomers, polyethylene terephthalate/polybutylene terephthalate, acetal/elastomer/styrene-maleic anhydride/ABS, polyether etherketone/polyethersulfone, polyethylene/polyamide, and polyethylene/acetal. Liquid crystalline polymers including, but not limited to, Kevlar® and LCP's, may also be used as the resin component.

Copolymers of two or more of any of the above mentioned components may also be useful as the resin component. In an attempt to be thorough, some of the components may have been repeated when described above. In sum, it is to be understood that any thermoset or thermoplastic resin will suffice as the resin component.

The thermoset or thermoplastic resin or resins that make up the resin component may be modified with supplemental additives including, but not limited to, antioxidants, coloring agents such as pigments and dyes, flame retardants, process aids, antistatic agents, impact modifiers, nucleating agents, flow aids, ignition resistant additives, coupling agents, lubricants, antiblocking agents, mold release additives, plasticizers, ultraviolet ray inhibitors, thermal stabilizers.

The thermoset or thermoplastic resin or resins that make up the resin component may also include fillers or reinforcing agents. Such fillers and reinforcing agents can be fibrous, granular or powder in form and include, but are not limited to, fibrous components such as glass fiber, carbon fiber, alumina fiber, and granular or powder components such as silica, clay, talc, carbon black, graphite, titanium dioxide, mica, calcium carbonate, calcium sulfate, barium carbonate, magnesium carbonate, magnesium sulfate, barium sulfate, oxysulfate, tin oxide, alumina, kaolin, silicon carbide, and metal powder.

The shape of the glass fiber is cloth-like, mat-like, strand-like, short fiber-like, and filament-like. Of these fibers, strand-like glass fibers having a length of 0.05 to 13 mm and a fiber diameter of 5 to 15 µm are preferred. Most preferable is the strand-like glass fiber subjected to silane treatment.

As the carbon fiber, polyacrylonitrile (PAN)-based fiber is preferred. Bundles of the chopped PAN fiber with a length of about 3 mm and a diameter of 7 to 15 µm are more preferable.

In the various filler and reinforcing agents above, particularly preferred are glass fillers such as glass powder, glass flake, glass beads, glass filament, glass fiber, glass roving, and glass mat. A coupling agent, such as a silane-based coupling agent or a titanium-based coupling agent, may be used for surface treatment of the above fillers and reinforcing agents.

Examples of the silane-based coupling agent are specifically, triethoxysilane, vinyltris(β-methoxyethoxy)silane, vinyltrimethoxysilane, hexenyltrimethoxysilane, gamma-methacryloxypropyltrimethoxysilane, gamma-acryloxypropyltrimethoxysilane, gamma-glycidoxypropyltrimethoxysilane, β-(1,1-epoxycyclohexyl)ethyltrimethoxysilane, N-β-(aminoethyl)-gamma-aminopropyltrimethoxysilane, N-β-(aminoethyl)-gamma-aminopropylmethyldimethoxysilane, gamma-aminopropyltriethoxysilane, N-phenyl-gamma-aminopropyltrimethoxysilane, gamma-mercaptopropyltrimethoxysilane gamma-chloropropyltrimethoxysilane, gamma-aminopropyltrimethoxysilane, gamma-aminopropyltrimethoxysilane, gamma-aminopropyl-tris(2-methoxyethoxy)silane, N-methyl-gamma-aminopropyltrimethoxysilane, N-vinylbenzyl-gamma-aminopropyltriethoxysilane, triaminopropyltrimethoxysilane, 3-ureidopropyltrimethoxysilane, 3-(4,5-dihydroimidazole)propyltriethoxysilane, hexamethyldisilazane, N,O-(bistrimethylsilyl)amide, N,N-bis(trimethylsilyl)urea and the like.

Examples of titanium-based coupling agents are specifically, isopropyltriisostearoyl titanate, isopropyltridodecylbenzenesulfonyl titanate, isopropyltris(dioctylpyrophosphate)titanate, tetraisopropylbis(dioctylphosphate) titanate, tetraoctylbis(ditridecylphosphite) titanate, tetra(1,1-diallyloxymethyl-1-butyl)bis(ditridecyl)phosphite titanate, bis(dioctylpyrophosphate)oxyacetate titanate, bis(dioctylpyrophosphate)ethylene titanate, isopropyltioctanoyl titanate, isopropyldimethacrylisostearoyl titanate, isopropylisostearoyldiacryl titanate, isopropyltri(dioctylphosphate)titanate, isopropyltricumylphenyl titanate, isopropyltri(N-amideethyl, aminoethyl)titanate, dicumylphenyloxyacetate titanate, and diisostearoylethylene titanate.

The composition also includes the additive. The additive includes a hydrosilylation reactive group for reaction with the addition-curable material. The hydrosilylation reactive group may be an ethylenically unsaturated functional group or a silicon hydride functional group. Either functional group reacts with the addition-curable material.

Where the hydrosilylation reactive group is the ethylenically unsaturated functional group, the additive is selected from the group consisting of an organopolysiloxane, an organic compound, copolymers of the organopolysiloxane and the organic compound, and mixtures thereof. Preferably, the additive contains the organopolysiloxane. Therefore, it is to be understood that if the additive contains a copolymer of organopolysiloxane and an organic compound, then the additive necessarily contains organopolysiloxane. One preferred organopolysiloxane is a polydiorganosiloxane or a partially-fluorinated polydiorganosiloxane. Alternatively, the additive is the organic compound. The organic compound includes oligomers, polymers, and monodisperse hydrocarbon chains having more than 3 carbon atoms as a backbone. Included are any α-olefins with sufficient chain length to mix with the resin component. The organic compound is selected from the group consisting of molecules containing ethylenic unsaturation and a reactive functional group selected from among carboxylic acids and metal salts thereof, anhydrides, succinates, acid chlorides, alcohols, amines, epoxides, isocyanates and esters. Examples of such organic compounds include 10-undecenoic acid, 10-undecen-1-ol, 10-undecenoyl chloride, zinc undecylenate, functionalized dodecenes having unsaturation at the first carbon atom in the chain, functionalized stearates having unsaturation at the first carbon atom in the chain, functionalized montanates having unsaturation at the first carbon atom in the chain, and mixtures thereof.

For permanence, it is preferred that the additive contain an additional moiety capable of reacting with a portion of the resin component described above, or be of sufficient molecular weight and compatibility to entangle or co-crystallize with the resin component. The reaction between the additional moiety and the portion of the resin component occurs through covalent bonding, ionic bonding, hydrogen bonding, chelation, coordination, acid-base interactions or even van der Waals forces. This additional moiety is part of the additive itself and not a separate component like the compatibilizing agent described below. Alternatively, the additive contains additional functional groups capable of reacting with another component of the resin component, or of reacting during processing to form a homopolymer or copolymer that is capable of entangling or co-crystallizing with the resin component.

In this embodiment, where the hydrosilylation reactive group is the ethylenically unsaturated functional group, the additive can have a linear, branched, or resinous structure. The additive can be a homopolymer or a copolymer. The unsaturated organic groups may be alkenyl groups having from 2 to 12 carbon atoms and are exemplified by, but not limited to, vinyl, allyl, butenyl, and hexenyl. The unsaturated organic groups may be alkynyl groups having 2 to 12 carbon atoms, and are exemplified by, but not limited to, ethynyl, propynyl, and butynyl. Alternatively, the unsaturated organic groups may contain acrylate-functional or methacrylate-functional groups and are exemplified by, but not limited to, acryloyloxyalkyl such as acryloyloxypropyl and methacryloyloxyalkyl such as methacryloyloxypropyl. The unsaturated organic groups may be located at terminal, pendant, or both terminal and pendant positions.

Any remaining silicon-bonded organic groups may be monovalent organic groups free of aliphatic unsaturation. These monovalent organic groups may have 1 to 20 carbon atoms, alternatively 1 to 10 carbon atoms, and are exemplified by, but not limited to alkyl such as methyl, ethyl, propyl, pentyl, octyl, undecyl, and octadecyl; cycloalkyl such as cyclohexyl; aryl such as phenyl, tolyl, xylyl, benzyl, and 2-phenylethyl; and cyano-functional groups such as cyanoalkyl groups exemplified by cyanoethyl and cyanopropyl; and halogenated hydrocarbon groups such as 3,3,3-trifluoropropyl, 3-chloropropyl, dichlorophenyl, and 6,6,6,5,5,4,4,3,3-nonafluorohexyl.

The additive may have a viscosity of 0.001 to 500 Pa·s at 25° C., alternatively 0.005 to 200 Pa·s at 25° C. The additive may also be a solid that becomes flowable at elevated temperatures, such as the temperatures used for polymer processing.

In this embodiment, the additive may comprise a organopolysiloxane fluid of the formula

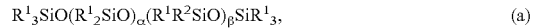 (a)

 (b)

a combination thereof.

In formula (a), α has an average value of 0 to 2000, and β has an average value of 1 to 2000. Each $R^1$ is independently a monovalent organic group. Suitable monovalent organic groups include, but are not limited to, acrylic functional groups such as acryloyloxypropyl and methacryloyloxypropyl; alkyl groups such as methyl, ethyl, propyl, and butyl; alkenyl groups such as vinyl, allyl, and butenyl; alkynyl groups such as ethynyl and propynyl; aromatic groups such as phenyl, tolyl, and xylyl; cyanoalkyl groups such as cyanoethyl and cyanopropyl; halogenated hydrocarbon groups such as 3,3,3-trifluoropropyl, 3-chloropropyl, dichlorophenyl, and 6,6,6,5,5,4,4,3,3-nonafluorohexyl; alkyloxypoly(oxyalkyene) groups such as propyloxy(polyoxyethylene), propyloxypoly(oxypropylene) and propyloxy-poly(oxypropylene)-co-poly(oxyethylene); alkoxy such as methoxy, ethoxy, n-propoxy, isopropoxy, n-butoxy and ethylhexyloxy; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole; epoxyalkyl groups such as 3-glycidoxypropyl, 2-(3,4-epoxycyclohexyl)ethyl, and 5,6-epoxyhexyl; ester functional groups such as actetoxymethyl and benzoyloxypropyl; hydroxyl functional groups such as hydroxy and 2-hydroxyethyl, isocyanate and masked isocyanate functional groups such as 3-isocyanatopropyl, tris-3-propylisocyanurate, propyl-t-butylcarbamate, and propylethylcarbamate; aldehyde functional groups such as undecanal and butyraldehyde; anhydride functional groups such as 3-propyl succinic anhydride and 3-propyl maleic anhydride; carboxylic acid functional groups such as 3-carboxypropyl and 2-carboxyethyl; and metal salts of carboxylic acids such as the Zn, Na or K salts of 3-carboxypropyl and 2-carboxyethyl. Each $R^2$ is independently an unsaturated monovalent organic group. $R^2$ is exemplified by alkenyl groups such as vinyl, allyl, and butenyl; alkynyl groups such as ethynyl and propynyl; and acrylic functional groups such as acryloyloxypropyl and methacryloyloxypropyl.

In formula (b), $\chi$ has an average value of 0 to 2000, and $\delta$ has an average value of 0 to 2000. Each $R^3$ is independently a monovalent organic group. Suitable monovalent organic groups include, but are not limited to, acrylic functional groups such as acryloyloxypropyl and methacryloyloxypropyl; alkyl groups such as methyl, ethyl, propyl, and butyl; alkenyl groups such as vinyl, allyl, and butenyl; alkynyl groups such as ethynyl and propynyl; aromatic groups such as phenyl, tolyl, and xylyl; cyanoalkyl groups such as cyanoethyl and cyanopropyl; halogenated hydrocarbon groups such as 3,3,3-trifluoropropyl, 3-chloropropyl, dichlorophenyl, and 6,6,6,5,5,4,4,3,3-nonafluorohexyl; alkyloxypoly(oxyalkyene) groups such as propyloxy(polyoxyethylene), propyloxypoly(oxypropylene) and propyloxy-poly(oxypropylene)-co-poly(oxyethylene); alkoxy such as methoxy, ethoxy, n-propoxy, isopropoxy, n-butoxy and ethylhexyloxy; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole; hindered aminoalkyl groups such as tetramethylpiperidinyloxypropyl; epoxyalkyl groups such as 3-glycidoxypropyl, 2-(3,4-epoxycyclohexyl)ethyl, and 5,6-epoxyhexyl; ester functional groups such as actetoxymethyl and benzoyloxypropyl; hydroxyl functional groups such as hydroxy and 2-hydroxyethyl, isocyanate and masked isocyanate functional groups such as 3-isocyanatopropyl, tris-3-propylisocyanurate, propyl-t-butylcarbamate, and propylethylcarbamate; aldehyde functional groups such as undecanal and butyraldehyde; anhydride functional groups such as 3-propyl succinic anhydride and 3-propyl maleic anhydride; carboxylic acid functional groups such as 3-carboxypropyl, 2-carboxyethyl and 10-carboxydecyl; and metal salts of carboxylic acids such as the Zn, Na or K salts of 3-carboxypropyl and 2-carboxyethyl. Each $R^4$ is independently an unsaturated organic hydrocarbon group. $R^4$ is exemplified by alkenyl groups such as vinyl, allyl, and butenyl; alkynyl groups such as ethynyl and propynyl; and acrylic functional groups such as acryloyloxypropyl and methacryloyloxypropyl.

For purposes of illustration, specific examples of organopolysiloxane fluids suitable for use as the additive in this embodiment include aminopropyldimethylsiloxy-terminated random copolymers of polydimethylsiloxane (PDMS) and polymethylvinylsiloxane (PMVS), α,ω-aminopropyldimethylsiloxy-terminated random copolymers of PDMS, poly(methyl-6,6,6,5,5,4,4,3,3-nonafluorohexylsiloxane) (PMNFHS) and PMVS, 3-glycidoxylpropyldimethylsiloxy-terminated random PDMS-PMVS copolymers, and 3-glycidoxylpropyldimethylsiloxy-terminated random PDMS-PMNFHS-PMVS copolymers.

Methods of preparing organopolysiloxane fluids suitable for use as the additive, such as hydrolysis and condensation of the corresponding organohalosilanes or equilibration of cyclic polydiorganosiloxanes, are well known in the art.

The additive may further comprise organosiloxane resins such as an MQ resin consisting essentially of $R^5{}_3SiO_{1/2}$ units and $SiO_{4/2}$ units, a TD resin consisting essentially of $R^5SiO_{3/2}$ units and $R^5{}_2SiO_{2/2}$ units, an MT resin consisting essentially of $R^5{}_3SiO_{1/2}$ units and $R^5SiO_{3/2}$ units, an MTD resin consisting essentially of $R^5{}_3SiO_{1/2}$ units, $R^5SiO_{3/2}$-units, and $R^5{}_2SiO_{2/2}$ units, or a combination thereof. It should be understood that the terminology organosiloxane resin as used herein is interchangeable with the terminology organopolysiloxane resin.

Each $R^5$ is a monovalent organic group. The monovalent organic groups represented by $R^5$ may have 1 to 20 carbon atoms, alternatively 1 to 10 carbon atoms. Examples of monovalent organic groups include, but are not limited to, acrylate functional groups such as acryloxyalkyl groups, methacrylate functional groups such as methacryloxyalkyl groups, cyano-functional groups, and monovalent hydrocarbon groups. Monovalent hydrocarbon groups include, but are not limited to, allyl such as methyl, ethyl, propyl, pentyl, octyl, undecyl, and octadecyl; cycloalkyl such as cyclohexyl; alkenyl such as vinyl, allyl, butenyl, and hexenyl; alkynyl such as ethynyl, propynyl, and butynyl; aryl such as phenyl, tolyl, xylyl, benzyl, and 2-phenylethyl; halogenated hydrocarbon groups such as 3,3,3-trifluoropropyl, 3-chloropropyl, dichlorophenyl, and 6,6,6,5,5,4,4,3,3-nonafluorohexyl. Cyano-functional groups include, but are not limited to, cyanoalkyl groups such as cyanoethyl and cyanopropyl. Also included are alkyloxypoly(oxyalkyene) groups such as propyloxy(polyoxyethylene), propyloxypoly(oxypropylene) and propyloxy-poly(oxypropylene)-co-poly(oxyethylene); alkoxy groups such as methoxy, ethoxy, n-propoxy, isopropoxy, n-butoxy and ethylhexyloxy; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine and 3-propylpyrrole; hindered aminoalkyl groups such as tetramethylpiperidinyloxypropyl; epoxyalkyl groups such as 3-glycidoxypropyl, 2-(3,4-epoxycyclohexyl)ethyl, and 5,6-epoxyhexyl; ester functional groups such as actetoxymethyl and benzoyloxypropyl; hydroxyl functional groups such as hydroxy and 2-hydroxyethyl, isocyanate and masked isocyanate functional groups such as 3-isocyanatopropyl, tris-3-propylisocyanurate, propyl-t-butylcarbamate, and propylethylcarbamate; aldehyde functional groups such as undecanal and butyraldehyde; anhydride functional groups such as 3-propyl succinic anhydride and 3-propyl maleic anhydride; carboxylic acid functional groups such as 3-carboxypropyl, 2-carboxyethyl, and 10-carboxydecyl; and metal salts of carboxylic acids such as the Zn, Na or K salts of 3-carboxypropyl and 2-carboxyethyl.

The organosiloxane resin may contain an average of 1 to 40 mole percent of unsaturated organic groups. The unsaturated organic groups may be alkenyl groups, alkynyl groups, acrylate-functional groups, methacrylate-functional groups, or combinations thereof. The mole percent of unsaturated organic groups in the resin is the ratio of the number of moles of unsaturated group-containing siloxane units in the resin to the total number of moles of siloxane units in the resin, multiplied by 100.

Specific examples of organosiloxane resins useful as the ethylenically unsaturated additive are M(vinyl)T(phenyl) resins of the type specified in U.S. Pat. No. 6,509,423 and the references cited therein.

Methods of preparing these organosiloxane resins are well known in the art. For example, resin may be prepared by treating a resin copolymer produced by the silica hydrosol capping process of Daudt et al. with at least an alkenyl-containing endblocking reagent. The method of Daudt et al., is disclosed in U.S. Pat. No. 2,676,182. Briefly stated, the method of Daudt et al. involves reacting a silica hydrosol under acidic conditions with a hydrolyzable triorganosilane such as trimethylchlorosilane, a siloxane such as hexamethyldisiloxane, or mixtures thereof, and recovering a copolymer having M and Q units. The resulting copolymers generally contain from 2 to 5 percent by weight of hydroxyl groups.

The organosiloxane resin, which typically contains less than 2 percent by weight of silicon-bonded hydroxyl groups, may be prepared by reacting the product of Daudt et al. with an unsaturated organic group-containing endblocking agent and an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare the resin.

Examples of organic compounds with polymeric backbones for this particular embodiment, to which an average of at least one ethylenically unsaturated group is incorporated per molecule, include but are not limited to hydrocarbon based polymers such as polyisobutylene, polybutadienes, polyisoprenes, polyolefins such as polyethylene, polypropylene and polyethylene-polypropylene copolymers, polystyrenes, styrene-butadiene, acrylonitrile-butadiene-styrene, polyacrylates, polyethers such as polyethylene oxide or polypropyleneoxide, polyesters such as polyethylene terephthalate or polybutylene terephthalate, polyamides, polycarbonates, polyimides, polyureas, polymethacrylates and partially fluorinated or perfluorinated polymers such as polytetrafluoroethylene, fluorinated rubbers, terminally unsaturated hydrocarbons, olefins, and polyolefins. The compound may also be a copolymer of any of the aforementioned polymers, including those comprised of multiple organic functionalities, multiple organopolysiloxane functionalities or combinations of organopolysiloxanes with organic compounds. The copolymer structure may range from random, grafted or blocky in arrangement of repeating units. The terms 'combination' and 'combinations' as used here and throughout the entirety of this application denote two or more components that are put together by any means.

Examples of the additive bearing ethylenic unsaturation wherein the additive is a copolymer of an organopolysiloxane with the aforementioned polymers include an unsaturated organopolysiloxane copolymerized with a second polymer which is compatible with the matrix. Examples include analogs of a PDMS-urea block copolymer described by Yilgor et al, Polymer Preprints (1998), 39(2), 1171-1172 or a Nylon 6-PDMS block copolymer (Macosko, Polym. Eng. Sci. (2001), 41(4), 631-642, and Argon and Cohen, Polymer Engineering and Science (1996), 36(6), 895-7), where the materials are differentiated in this embodiment of the present invention by the inclusion of ethylenic unsaturation in the organopolysiloxane. Thusly modified, specific examples of block copolymers useful as the additive in this invention include PDMS-PMVS-urea, PDMS-PMVS-polyamide, and PDMS-PMVS-polybutylene terephthalate (PBT) block copolymers, where the monomeric segments comprising PDMS and PMVS may be randomly connected as long as the organic polymer repeat units are arranged together as one or more separate blocks. Yilgor, in publications, lists dozens of other PDMS-organic block copolymers that serve as a basis for modification by inclusion of ethylenically unsaturated moieties to be made useful by this invention. Further, it may be advantageous to include additionally, or substitute for the PDMS segments, fluorinated or partially fluorinated organopolysiloxane segments in such a copolymer. One analogous example of this latter class includes PDMS-PMVS-PMN-FHS-polyamide copolymers, where the PDMS-PMVS and PMNFHS monomeric segments may be randomly distributed but the polyamide polymer segments are arranged together as a separate block. These block copolymers can either be preformed before blending with the matrix polymer or formed while blending with the matrix polymer.

One particular class of ethylenically unsaturated block copolymers is formed by the reaction of a primary amine functionalized organopolysiloxane also functionalized with ethylenic unsaturated groups, with an anhydride, carboxylic acid, or isocyanate functionalized polymer. Anhydrides and primary amines react easily to form strong imide linkages. Isocyanates and primary amines react to form urea linkages. Imides are also formed by reaction of dicarboxylic acids and primary amines. Primary amines and carboxylic acids form amide linkages. The primary amines can be introduced onto the siloxane copolymer endgroups or as pendant groups. The anhydrides or acids can be introduced into the other block as endgroups, pendant groups, or in the backbone. Of this class, one example is the reaction product of an aminopropyldimethylsiloxy-terminated PDMS-PMVS random copolymer with a maleated poly(phenylene ether) polymer. Similarly, amine functionalized siloxanes can be reacted with other anhydride functionalized polymers to form block copolymers of ethylenically unsaturated organopolysiloxanes with polymers such as polystyrene, syndiotactic polystyrene, polyethylene, polypropylene, polyacrylates, polymethacrylates, polybutadienes, polytetrafluoroethylene, polycarbonates, polyamides, polyesters, polyimides. Again, these copolymers can be formed in-situ during processing, such as by reactive extrusion, or synthesized ex-situ.

Where the hydrosilylation reactive group is the silicon hydride functional group, the additive is selected from the group consisting of an organohydrogenpolysiloxane, an organic compound, copolymers of the organohydrogenpolysiloxane and the organic compound, and mixtures thereof. In this embodiment, the additive preferably has an average of at least one silicon-bonded hydrogen atoms per molecule.

In this embodiment, where the hydrosilylation reactive group is the silicon hydride functional group, the additive can be a homopolymer or a copolymer and can have a linear, branched, cyclic, or resinous structure. The silicon-bonded hydrogen atoms can be located at terminal, pendant, or at both terminal and pendant positions.

The additive of this embodiment can comprise siloxane units including, but not limited to, $HR^6_2SiO_{1/2}$, $R^6_3SiO_{1/2}$, $HR^6SiO_{2/2}$, $R^6_2SiO_{2/2}$, $R^6SiO_{3/2}$, and $SiO_{4/2}$ units. In the preceding formulae, each $R^6$ is independently selected from monovalent organic groups free of aliphatic unsaturation.

In this embodiment, the additive may comprise a compound of the formula

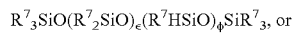

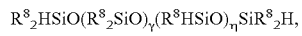

a combination thereof.

In formula (c), $\epsilon$ has an average value of 0 to 2000, and $\phi$ has an average value of 1 to 2000. Each $R^7$ is independently a monovalent organic group free of aliphatic unsaturation. Suitable monovalent organic groups free of aliphatic unsaturation include alkyl groups such as methyl, ethyl, propyl, and butyl; aromatic groups such as phenyl, tolyl, and xylyl; cyan-functional groups exemplified by cyanoalkyl groups such as cyanoethyl and cyanopropyl; halogenated hydrocarbon groups such as 3,3,3-trifluoropropyl, 3-chloropropyl, dichlorophenyl, and 6,6,6,5,5,4,4,3,3-nonafluorohexyl; alkyloxypoly(oxyalkyene) groups such as propyloxy(polyoxyethylene), propyloxypoly(oxypropylene) and propyloxypoly(oxypropylene)-co-poly(oxyethylene); alkoxy groups such as methoxy, ethoxy, n-propoxy, isopropoxy, n-butoxy and ethylhexyloxy; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole; hindered aminoalkyl groups such as tetramethylpiperidinyloxypropyl; epoxyalkyl groups such as 3-glycidoxypropyl, 2-(3,4-epoxycyclohexyl)ethyl, and 5,6-epoxyhexyl; ester functional groups such as actetoxymethyl and benzoyloxypropyl; hydroxyl functional groups such as hydroxy and 2-hydroxyethyl, isocyanate and masked isocyanate functional groups such as 3-isocyanatopropyl, tris-3-propylisocyanurate, propyl-t-butylcarbamate, and propylethylcarbamate; aldehyde functional groups such as undecanal and butyraldehyde; anhydride functional groups such as 3-propyl succinic anhydride and 3-propyl maleic anhydride; carboxylic acid functional groups such as 3-carboxypropyl, 2-carboxyethyl, and 10-carboxydecyl; and metal salts of carboxylic acids such as the Zn, Na or K salts of 3-carboxypropyl and 2-carboxyethyl.

In formula (d), $\gamma$ has an average value of 0 to 2000, and $\eta$ has an average value of 0 to 2000. Each $R^8$ is independently a monovalent organic group free of aliphatic unsaturation. Suitable monovalent organic groups free of aliphatic unsaturation include alkyl groups such as methyl, ethyl, propyl, and butyl; aromatic groups such as phenyl, tolyl, and xylyl; halogenated hydrocarbon groups such as 3,3,3-trifluoropropyl, 3-chloropropyl, dichlorophenyl, and 6,6,6,5,5,4,4,3,3-nonafluorohexyl; alkyloxypoly(oxyalkyene) groups such as propyloxy(polyoxyethylene), propyloxypoly(oxypropylene) and propyloxy-poly(oxypropylene)-co-poly(oxyethylene); alkoxy groups such as methoxy, ethoxy, n-propoxy, isopropoxy, n-butoxy and ethylhexyloxy; and cyan-functional groups exemplified by cyanoalkyl groups such as cyanoethyl and cyanopropyl. Also included are aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole; hindered aminoalkyl groups such as tetramethylpiperidinyloxypropyl; epoxyalkyl groups such as 3-glycidoxypropyl, 2-(3,4-epoxycyclohexyl)ethyl, and 5,6-epoxyhexyl; ester functional groups such as actetoxymethyl and benzoyloxypropyl; hydroxyl functional groups such as hydroxy and 2-hydroxyethyl, isocyanate and masked isocyanate functional groups such as 3-isocyanatopropyl, tris-3-propylisocyanurate, propyl-t-butylcarbamate, and propylethylcarbamate; aldehyde functional groups such as undecanal and butyraldehyde; anhydride functional groups such as 3-propyl succinic anhydride and 3-propyl maleic anhydride; carboxylic acid functional groups such as 3-carboxypropyl, 2-carboxyethyl, and 10-carboxydecyl; and metal salts of carboxylic acids such as the Zn, Na or K salts of 3-carboxypropyl and 2-carboxyethyl.

For purposes of illustration, specific examples of organopolysiloxane fluids suitable for use as the additive in this embodiment include aminopropyldimethylsiloxy-terminated random copolymers of PDMS and polymethylhydrogensiloxane (PMHS), α,ω-aminopropyldimethylsiloxy-terminated random copolymers of PDMS, PMNFHS and PMHS, 3-glycidoxylpropyldimethylsiloxy-terminated random PDMS-PMHS copolymers, and 3-glycidoxylpropyldimethylsiloxy-terminated random PDMS-PMNFHS-PMHS copolymers.

Examples of organic backbones for this particular embodiment, to which an average of at least one silicon-bonded hydrogen atoms is incorporated per molecule, include but are not limited to hydrocarbon based polymers such as polyisobutylene, polybutadienes, polyisoprenes, polyolefins such as polyethylene, polypropylene and polyethylene-polypropylene copolymers, polyethers, polyesters, polyamides, polycarbonates, polyimides, polyureas, polyurethanes, polystyrenes, styrene-butadiene, acrylonitrile-butadiene-styrene, polyacrylates, polymethacrylates and partially fluorinated or perfluorinated polymers such as polytetrafluoroethylene, and fluorinated rubbers. The additive may also be a copolymer of any of the aforementioned polymers, including those comprised of multiple organic functionalities, multiple organopolysiloxane functionalities, multiple organohydrogenpolysiloxane functionalities or combinations of organopolysiloxanes and organohydrogenpolysiloxanes with organic compounds. The copolymer structure may range from random, grafted or blocky in arrangement of repeating units.

Examples of the additive bearing silicon hydride functionality wherein the additive is a copolymer of an organopolysiloxane with the aforementioned polymers include a silicon-hydride functional organopolysiloxane copolymerized with a second polymer which is compatible with the matrix. Examples include analogs of a PDMS-urea block copolymer described by Yilgor et al, Polymer Preprints (1998), 39(2), 1171-1172 or a Nylon 6-PDMS block copolymer (Macosko, Polym. Eng. Sci. (2001), 41(4), 631-642, and Argon and Cohen, Polymer Engineering and Science (1996), 36(6), 895-7), where the materials are differentiated in this embodiment of the present invention by the inclusion of at least one silicon hydride group in the organopolysiloxane. Thusly modified, specific examples of block copolymers useful as the additive in this invention include PDMS-PMHS-urea, PDMS-PMHS-polyamide, and PDMS-PMHS-PBT block copolymers, where the monomeric segments comprising PDMS and PMHS may be randomly connected as long as the organic polymer repeat units are arranged together as one or more separate blocks. Yilgor, in publications, lists dozens of other PDMS-organic block copolymers that seine as a basis for modification by inclusion of silicon hydride moieties to be made useful by this invention. Further, it may be advantageous to include additionally, or substitute for the PDMS segments, fluorinated or partially fluorinated organopolysiloxane segments in such a copolymer. One analogous example of this latter class includes PDMS-PMHS-PMNFHS-polyamide copolymers where the PDMS-PMHS and PMNFHS monomeric segments may be randomly distributed but the polyamide polymer segments are arranged together as a separate block. These block copolymers can either be preformed before blending with the matrix polymer or formed while blending with the matrix polymer.

One particular class of silicon hydride functional block copolymers is formed by the reaction of a primary amine functionalized organopolysiloxane also functionalized with silicon hydride groups, with an anhydride, carboxylic acid, or isocyanate functionalized polymer. Anhydrides and primary amines react easily to form strong imide linkages. Isocyanates and primary amines react to form urea linkages. Imides are also formed by reaction of dicarboxylic acids and primary amines. Primary amines and carboxylic acids form amide linkages. The primary amines can be introduced onto the siloxane copolymer endgroups or as pendant groups. The anhydrides or acids can be introduced into the other block as endgroups, pendant groups, or in the backbone. Of this class, one example is the reaction product of an aminopropyldimethylsiloxy-terminated PDMS-PMHS random copolymer with a maleated poly(phenylene ether) polymer. Similarly, amine functionalized siloxanes can be reacted with other anhydride functionalized polymers to form block copolymers of silicon hydride functional organopolysiloxanes with polymers such as polystyrene, syndiotactic polystyrene, polyethylene, polypropylene, polyacrylates, polymethacrylates, polybutadienes, polytetrafluoroethylene, polycarbonates, polyamides, polyesters, polyimides. Again, these copolymers can be formed in-situ during processing, such as by reactive extrusion, or synthesized ex-situ.

Methods of preparing linear, branched, and cyclic organohydrogenpolysiloxanes suitable for use as the additive, such as hydrolysis and condensation of organohalosilanes, are well known in the art. Methods of preparing organohydrogenpolysiloxane resins suitable for use as the additive are also well known as exemplified in U.S. Pat. Nos. 5,310,843; 4,370,358; and 4,707,531.

It is to be understood that the hydrosilylation reactive group in the additive may include a blend of the ethylenically unsaturated functional group and the silicon hydride functional group. Of course, in this specific instance it is preferred that the composition be free of hydrosilylation catalysts, which are described additionally below.

In any embodiment, the additive can be a single polymer (defined to include copolymers), an organic compound, a combination comprising two or more polymers, two or more organic compounds, or one or more polymer and one or more organic compound that differ in at least one of the following properties: stricture, average molecular weight, viscosity, siloxane units, and sequence.

In any embodiment, although not required, it is preferred that the additive is present in an amount of from 0.001 to 30, more preferably from 0.01 to 5.0, parts by weight based on 100 parts by weight of the resin component.

The composition may further include a catalyst. If included, the catalyst is preferably selected from the group of hydrosilylation catalysts and activators for free radical initiators.

For example, the hydrosilylation catalyst may be added to the composition in an amount of 0.1 to 1000 ppm of catalyst, alternatively 1 to 500 ppm, alternatively 2 to 200, alternatively 5 to 150 ppm based on the weight of the composition. Suitable catalysts are known in the art and are commercially available. The catalyst may include a platinum group metal selected from platinum, rhodium, ruthenium, palladium, osmium or iridium metal or organonmetallic compound thereof, or a combination thereof. The catalyst is exemplified by compounds such as chloroplatinic acid, chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum and halogen-substituted-organosiloxane complexes with platinum. These complexes may be micro encapsulated in a resin matrix.

Suitable hydrosilylation catalysts are described in, for example, U.S. Pat. Nos. 3,159,601; 3,220,972; 3,296,291; 3,419,593; 3,516,946; 3,814,730; 3,989,668; 4,784,879; 5,036,117; 5,175,325 and EP 0 347 895 B. Microencapsulated hydrosilylation catalysts are also suitable and methods of preparing them are known in the art, as exemplified in U.S. Pat. No. 4,766,176 and the references cited therein; and U.S. Pat. No. 5,017,654.

Examples of activators for free radical initiators include transition metal activators for organic peroxides such as cobalt (II) naphthenate, cobalt (II)-2-ethylhexanoate, and iron octoate; organic activators for peroxides such as N,N-dimethyl-p-toluidine, and 2,6-diethyl aniline; and decomplexers for alkylborane-amine complexes possessing amine reactive groups, such as acrylic acid, methacrylic acid, isocyanate-, anhydride- and carboxylic acid-functional organopolysiloxanes, isophorone diisocyanate, and isocyanatopropyl triethoxysilane.

The composition may also include a compatibilizing agent for compatibilizing the resin component and the additive. Preferably, the compatibilizing agent is an organic segment compounded with the additive where the organic segment is at least partially compatible with the chemical make-up of the resin component. If included, the compatibilizing agent may include, but is not limited to, solvents such as toluene, xylene, tetrahydrofuran, and heptane; cyclosiloxanes or dimethylsiloxane fluids of less than 20 cP; non-ionic surfactants such as polypropyleneglycol and polyethylene glycol; anionic surfactants; cationic surfactants; and silane or titanate coupling agents.

In one preferred embodiment, the resin has a first surface energy and the additive has a second surface energy. The second surface energy, i.e., the surface energy of the additive, is less than the first surface energy. As a result, the additive migrates toward a surface of the substrate, which is formed from the composition, to improve adherence of the substrate with the addition-curable material, which can be an adhesive, a gasket, a coating, or the like. This phenomenon is also referred to as surface enrichment. If either the resin component or additive are solid in form, then the surface energy is more aptly referred to in the art as surface free energy. On the other hand, if either the resin component or additive are liquid in form, then the surface energy is more aptly referred to in the art as liquid surface tension.

Alternatively, or in addition to the relative surface energies, the additive can have a physical property that enables the hydrosilylation reactive group of the additive to be present at a surface the substrate or substrates of the composite article. More specifically, the additive can have a certain physical property that causes the additive to migrate toward the surface of the substrate or substrates to enrich the surface thereby improving adherence of the substrate with the addition-curable material. The relative differences between the physical properties of the resin component and of the additive may enhance this migration. The physical property of the additive may include, but is not limited to, density, a solubility parameter, molecular structure, molecular weight, viscosity, and combinations thereof.

The resin component and additive can also be processed at conditions that favor migration of the additive to the surface. For example, in extrusion or injection molding, the extrusion or injection speed, melt temperatures, mold temperature, and cycle time can be varied to achieve the desired migration. The migration of the additive and its hydrosilylation groups to the surface can be further enhanced by the process used to form the substrate of the composite article, utilizing effects such as migration across rheological streamlines and thermal gradients.

Another aspect of the present invention is to anneal or perform some other secondary operation that leads to migration of the additive to the surface. Another possible treatment is exposure to an extracting solvent or solvent vapors.

Although the additive migrates to the surface, it must also be "anchored" to the resin component, either by chemical or physical means for permanence. This anchoring can be accomplished by polymer entanglement, co-crystallization, ionic interaction, hydrogen bonding, acid-base or other binary interactions, or covalent bonding of the additive to some portion of the resin component.

Particularly in a case where the additive is of an equal or higher surface energy than the resin component, it is usually preferred that the additive either have a solubility parameter differing by greater than 1-2 $(MPa)^{0.5}$ from the resin component and/or be lower in viscosity, density and/or molecular weight than the resin component.

Generally, the composition of the present invention is made by compounding the resin component and the additive together and various methods for making the composition are described immediately below. The composition, including the resin component and the additive, can be made by batch, semi-continuous, or continuous polymer processing equipment that is well known in the art. Preferably, the composition is made is a twin-screw extruder or injection molding apparatus. As a result, in the most preferred embodiment, the additive is incorporated into the resin component via co-extrusion with the resin component, which is added into the twin-screw extruder in the form of solid pellets. However, it is also to be understood that the additive can be incorporated into the resin component after the resin component has been extruded in the twin-screw extruder.

More specifically, the composition of the present invention is typically produced by compounding all the components in a mixing device such as an extruder. Mechanical mixing devices such as extruders, ribbon blenders, solution blending, co-kneaders, twin-rotor mixers, Banbury-type mixer or any other suitable device or technique may be utilized. All components, the resin component and the additive (and any fillers, reinforcing agents, nucleating agents, stabilizers, compatibilizers, and the like) can be compounded together in an extruder. Additives can be added into the mixing device at different locations or may be included as a master batch. Liquid components can be injected into the mixing device, or mixed with dry components and then fed to the mixing device. All mixing should be done at temperatures that allow good melting and mixing of all components, but that are not too high to cause degradation.

It is also possible to make solid pellets with the composition where the composition is highly concentrated in the amount of additive as compared to the amount of the resin component. The additive can be added at any point in the process to facilitate efficient delivery of the additive. One such approach is commonly referred to as the "salt & pepper" approach commonly used for colorants in plastics.

The composition of the present invention can be made into useful articles using, among other processes, typical thermoplastic or thermoset processes. One aspect of the present invention is related to films formed from the composition. The films can be monolayer or multilayer films as well as uniaxial, biaxial and multiaxial oriented films. The film typically has a thickness of less than 20 mils. Such films include, but are not limited to, cast films such as capacitor films, key pads, uniaxially oriented film, weatherable film, labels, release liners, envelope window film, box/carton window film, medical packaging film, film sheet, trays, graphic art films, membrane switches, blister packaging for food and pharmaceuticals and UV protection films, blown films such as biaxially oriented films and solvent cast films.

Methods of making films from compositions like that of the subject invention are well known in the art and described in *Plastics Engineering Handbook* of the Society of the Plastics Industry, Inc., Fourth Edition, 1976, pages 156, 174, 180 and 183.

Another aspect of the present invention is related to sheet made from the composition. Sheet typically has a thickness of 20 mils or more. The sheet can be used to produce products which include, but are not limited to, automotive glazing, architectural glazing, point of purchase displays, machine guards, ceiling light panels, solar collectors, flat panel displays, basketball backboards, wind screens, bug deflectors, sun roofs, signage, protective sheet (such as boards used in hockey rinks), and the like. Additionally, sheet can be thermoformed to produce articles such as containers and the like.

Methods of making sheet from compositions like that of the subject invention are well known in the art and include extrusion, and calendering, all of which are described in *Plastics Engineering Handbook* of the Society of the Plastics Industry, Inc., Fourth Edition, 1976, on pages 183, 348, and 357.

Additional applications of film and sheet include substrates for electronic devices such as those used in rigid circuit boards and tapes for flexible and semi-flexible electronic circuitry, microwaveable sheet and packaging, thermoformed cups/containers, sunroofs, containers and trays for food, liquid crystal display substrates, rear projection TV screens, beverage machine covers, labels, architectural and greenhouse glazing, bug deflectors and side wind screens, microwave or appliance doors, coatings, films or protective cap layers for improved surface hardness, scratch or abrasion resistance, surface luster and transparency; graphic arts film, laser-readable parcel window film, index tabs, pharmaceutical packaging, solar cell covers, heat sealable films, photosensitive films, weatherable film or sheet, electrical and capacitor films, transparency films, barrier films, window films, steam sterilization film, recreational vehicle exteriors, boat/marine exterior components such as transparent hatches, camper tops and outdoor signage.

The films and sheet may be monolayer or multilayer in structure. Additional layers may be other polymeric materials. The above sheets can be thermoformed into articles by well known methods.

Another aspect of the present invention is related to extruded profiles made from the composition. Such profiles include, but are not limited to, window blinds and wand profiles, roofing products, exterior trim, window trim, tubing, pipe, rods, fluorescent light tubes, packaging, plastic lumber and the like.

Methods of making profiles from compositions like that of the subject invention are well known in the art and described in *Plastics Engineering Handbook* of the Society of the Plastics Industry, Inc., Fourth Edition, 1976, page 191.

Another aspect of the present invention is related to fibers made from the composition. Such fibers include, but are not limited to, electronic optic fibers, fiber glass applications, fiber reinforcement, filter media, textiles, nonwovens, yarns and the like.

Methods of making fibers from compositions like that of the subject invention are well known in the art and include spunbond fibers or melt blown fibers as disclosed in U.S. Pat. Nos. 4,340,563; 4,663,220; 4,668,566; or 4,322,027, gel spun fibers disclosed in U.S. Pat. No. 4,413,110, and fabrics produced therefrom which is disclosed in U.S. Pat. No. 3,485,706, all of which are incorporated herein by reference.

Another aspect of the present invention is related to coated articles made from the composition. Coated articles include extrusion coated articles and aqueous dispersion coated articles, coated fabric, coated inorganic materials such as concrete, glass and the like, coated paper or cardboard, coated wood products, and coated metal products. Examples include carpet backing, awnings, shading fabric, indoor and outdoor sun screens, wall coverings, food packaging, microporous waterproof wovens, tent fabrics, and caravan extensions, garden furniture garments, safety and protective wovens, films, fibers, apparel, bandages, and the like. Alternatively, coating products can be produced using a spin coating process, wherein the composition is spin coated onto a mold to produce an article; such as spin coating an optical media disc or spin coating onto an optical media disc. Additionally, dipped products can also be made using coatings of the composition. In particular, dipped goods can be produced using aqueous dispersions of the composition or blends thereof.

Methods of coating with compositions like that of the subject invention are well known in the art and include extrusion, solvent casting, and coating from aqueous dispersion/emulsions, all of which are described in *Plastics Engineering Handbook* of the Society of the Plastics Industry, Inc., Fourth Edition, 1976, on pages 185, and spin coating as described in U.S. Pat. Nos. 5,635,114; 5,468,324; and 5,663,016, which are incorporated herein by reference.

Another aspect of the present invention is related to injection molded articles made from the composition. Injection molded articles include, but are not limited to, appliance parts, recreational articles, automotive applications such as valve covers, intake manifold covers, under-the-hood protective housings, connectors, sensors, power distribution centers, and other automotive electronic and electrical parts, industrial parts, lawn and garden machinery, information technology parts, computer equipment, communication parts, and tool parts.

Methods of injection molding with compositions like that of the subject invention are well known in the art and are described in *Plastics Engineering Handbook* of the Society of the Plastics Industry, Inc., Fourth Edition, 1976, on page 83.

Another aspect of the present invention is related to rotational molded articles, which include large articles such as toys (hobbyhorses, dolls, sandboxes, small swimming pools, and athletic balls), containers, light globes, storage tanks, furniture, carboys, bottles, shipping containers, business and recreational furniture, planters, trash containers, whirlpool tubs, light globes, boats, canoes, camper tops, advertising display signs, racks, mannequins and the like.

Methods of rotational molding and rotational/slush molding with compositions like that of the subject invention are described in *Plastics Engineering Handbook* of the Society of the Plastics Industry, Inc., Fourth Edition, 1976, page 348.

Another aspect of the present invention is related to blow molded articles made from the composition. Blow molded articles include, but are not limited to, extruded bottles, injection molding bottles such as baby bottles and medical use bottles, water tanks, air ducts, hollow industrial parts, seat backs, fluid reservoirs, stadium seating, structural covers for office equipment, and the like.

Methods of blow molding with compositions like that of the subject invention are well known in the art and are described in *Plastics Engineering Handbook* of the Society of the Plastics Industry, Inc., Fourth Edition, 1976, on page 326.

Another aspect of the present invention is related to pultruded articles made from the composition. Pultruded articles are continuous, cross-sectional, composite, extruded profiles produced by extruding a polymer melt and continuous fiber, simultaneously, through the same profile die, structural beams, reinforcement bar, barricades, composite pipe, automotive bumper moldings, concrete reinforcement, window/door lineals, wood reinforcement, glulam (laminated joists) and the like.

Methods of pultrusion with compositions like that of the subject invention are well known in the art and are described in *Plastics Engineering Handbook* of the Society of the Plastics Industry, Inc., Fourth Edition, 1976, on page 47.

Another aspect of the present invention relates to foamed articles made from the composition by foaming the composition and then performing one of the above processing techniques. Blowing agents and blowing techniques known to be effective for resins can be used to foam the composition and to create the foamed articles.

Another aspect of the present invention relates to articles produced from the composition by casting, or compression molding.

Another aspect of the present invention relates to articles produced from the composition by typical thermoset processing techniques such as pultrusion, lay-Lip, reaction injection molding, sheet molding compound, and casting.

All end-use applications can be provided as monolayer or multilayer articles, wherein any layer comprises the composition as described herein.

Addition-curable materials are known in the art and the addition-curable material for use in the composite structure can be any chemical component so long as it is curable by an addition reaction. Depending upon their specific composition, the addition-curable materials may be cured at room temperature or the cure may be accelerated by application of heat or radiation. In some cases, the composition of the addition-curable material is divided into two or more separate components to give a material that cures rapidly upon mixing, while retaining stability in the stored state where the separate components are unmixed. Typically, the addition-curable composition is applied to the substrate before the addition-curable composition is cured. However, the addition-curable material may be applied to the substrate or substrates in a partially-cured, or even fully-cured, condition (for example as a pre-formed sheet), and then subjected to a subsequent post-cure via application of additional heat, radiation or time. Preferably, the addition-curable material is an organosilicon-containing material that is curable via hydrosilylation, free radical cure, anionic, or cationic cure. More preferably, the addition-curable material is a silicone adhesive, elastomer, gel, or resin that is curable by hydrosilylation, i.e., a hydrosilylation-curable material, such as those that are widely known in the art. It is to be understood that the addition-curable material can be filled or unfilled. Included as examples are siloxane adhesives, elastomers, gels and resins that are modified with additives known in the art such as cure modifiers, reinforcing fillers, extending fillers, thermally conductive fillers, adhesion promoters, pigments, dyes, void reducing agents, acid acceptors, anti-oxidants, stabilizers, heat stabilizers, ultraviolet stabilizers, flame retardants, silylating agents, desiccants, and blowing agents. In cases where the composition is embodied by the resin component with an additive having ethylenically unsaturated groups, it may be particularly advantageous to use a hydrosilylation curable elastomer having a molar excess of silicon hydride functional groups relative to ethylenic unsaturated groups in the elastomer (SiH:Vi ratio >1) and/or that contains a surface active silicon hydride functional component in the elastomer. In cases where the composition is embodied by the resin component with an additive having silicon hydride functional groups, it may be particularly advantageous to use a hydrosilylation curable elastomer having a molar excess of ethylenic unsaturated groups relative to silicon hydride groups in the elastomer (SiH:Vi<1) and/or that contains a surface active ethylenically unsaturated component in the elastomer.

In any event, the addition-curable material is disposed, i.e., applied, onto the substrate or between multiple substrates, wherein at least one of the substrates comprises the composition of the subject invention. It is to be understood that the remainder of the substrates may also be of the said composition, or completely different, such as a metal or an inorganic substrate. Also, the substrates themselves may be multilayered, as long as at least one of the layers onto which the addition-curable material is disposed comprises the composition of the present invention. As such, there is improved adhesion between the addition-curable material and the substrate or substrates of the composite article because at least one, if not all, of the substrates is formed from the composition and the composition includes the additive having the hydrosilylation reactive group for reaction with the addition-curable material.

The subject invention also relates to an improved method of making the composite article. In this method, the addition-curable material is bonded to at least one substrate of the composite article, which is formed from the composition. This method generally involves curing the addition-curable material to make the composite articles at temperatures below 150° C., especially at room temperature, and achieving sufficient adherence. However, the method and the various possible ranges for this temperature are described additionally below.

The improved method includes disposing the addition-curable material, preferably an adhesive, on at least one substrate, and then curing the addition-curable material at a temperature that is lower than temperatures that have previously been employed and that would otherwise be possible such that the substrate and the addition-curable material bond together at the lower temperature to make the composite article. When the addition-curable material is cured according to the method of the present invention, the substrate and the addition-curable material are bonded together at lower temperatures than would otherwise be possible. That is, with a substrate formed from the composition, i.e., the resin component and the additive, of the present invention, composite articles can be made at temperatures that are lower than temperatures used when making prior art composite articles. It is to be understood that the temperature at which the addition-curable material is cured such that the substrate and the addition-curable material bond together may vary depending on the particular resin component of the composition that forms the substrate.

Generally, this temperature ranges from −100° C. to 300° C. However, depending on the particular resin component, the temperatures within this broad range may vary. For that matter, even the range of from −100° C. to 300° C. may vary with a bottom end temperature lower than −100° C. and a top end temperature greater than 300° C. If, for example, the resin component is a non-polar plastic like unmodified syndiotactic polystyrene, PTFE, or a polyolefin, such as polyethylene, polypropylene, and the like, then the top end temperature for curing the addition-curable material such that the substrate and the addition-curable material bond together is, more specifically, <300° C. However, to reap the maximum benefit in such an example, it is preferred that the temperature range be from −40° C. to 150° C., more preferably from 0° C. to 100° C., and most preferably from 15° C. to 35° C. As a further non-limiting example, if the resin component is something like glass-reinforced PBT, then the top end temperature for curing the addition-curable material such that the substrate and the addition-curable material bond together is, more specifically, <80° C. To reap the maximum benefit in such an example, it is preferred that the temperature range be from 40° C. to 80° C., more preferably from 0° C. to 60° C., and most preferably from 15° C. and 35° C. Separately, the step of curing the addition-curable material such that the substrate and the addition-curable material bond together ranges in time from 5 s to 24 h, more preferably 30 s to 2 h. This method produces a composite article that is both fully cured and fully adhered. Finally, the addition-curable material may be disposed on the substrate, i.e., applied, in a number of ways well known in the art, such as by meter mixing, extruding, and/or using robotic or manual application.

In one embodiment of the method, a fully bonded composite article is made by disposing the addition-curable material onto at least one substrate, which is formed from the composition, at temperatures less than the boiling point of water (100° C.), then concurrently curing the addition-curable material and bonding it to the substrate or substrates, thereby obviating the need for pre-drying of the substrates. In another embodiment of the method, the composite article is cured and bonded in similar fashion at room temperature, allowing the elimination of curing ovens.

As noted above, it is to be understood that any addition-curable material can be used with the composition of the subject invention. Although the preferred addition-curable material is a silicone adhesive, elastomer or resin that is curable by hydrosilylation, other addition-curable materials may be used including, but not limited to, free radical curable materials and cationic curable materials that will chemically interact with either ethylenic unsaturation or silicon hydride. One advantage of the invention is that it is possible to omit adhesion promoting compounds, which may add cost or have other deleterious consequences to performance, from the addition-curable material if so desired without losing adhesion to the composition of the subject invention. However, for adhesion to other substrates not covered under the resin composition, such as substrates with metallic and inorganic glass surfaces, it may be advantageous for the addition-curable material to contain adhesion promoting compounds, such as silane coupling agents well known in the art, which will not hinder the cure or adhesion to the resin composition.

In one embodiment, the composition includes a particular resin component and a particular additive. More specifically, in this embodiment, the resin component is organic and polymeric and free of ethylenically unsaturated and silicon hydride functional groups. As described above, the particular resin component is generally chosen depending on the application for the composite article. Examples of suitable resin components in this embodiment include, but are not limited to, polymer, or polymeric, resin components that are derived from a monomer or monomers selected from the group of styrene, substituted styrenes, diamines, diacids, lactams, diols, olefin, substituted olefin, dienes, diisocyanate, epoxide, phenol, substituted phenols, ketones, substituted ketones, aldehydes, substituted aldehydes, acrylates, methacrylates, acrylic acid, fumaric acid, maleic acid, maleic anhydride, carbon dioxide, and combinations thereof. Alternatively, the resin component may be further defined as a polymer selected from the group of polystyrenes, polyamides, polycarbonates, polyolefins, styrene acrylonitriles, acrylonitrile-butadiene-styrenes, polyesters, polyurethanes, epoxies, polyphenylene oxides, halogen-substituted organic polymers, polyphthalamides, polyphenylene sulfides, liquid crystalline polymer, polycyclohexaneterephthalates, and combinations thereof. More specific examples of suitable resin components include, but are not limited to, those resin components selected from the group of atactic polystyrene, isotactic polystyrene, syndiotactic polystyrene, nylon 6, nylon 6,6, polyethylene terephthalate, polybutylene terephthalate, polyethylene, polypropylene, polytetrafluoroethylene, cyanate esters, bismaleimide triazine, and combinations thereof.

Like the wide variety of suitable resin components described above, the resin components in this embodiment may be modified with supplemental additives including, but not limited to, antioxidants, coloring agents such as pigments and dyes, flame retardants, process aids, antistatic agents, impact modifiers, nucleating agents, flow aids, ignition resistant additives, coupling agents, lubricants, antiblocking agents, mold release additives, plasticizers, ultraviolet ray inhibitors, thermal stabilizers. These particular resin components resin components may incorporate fillers or reinforcing agents like those described above. Furthermore, a coupling agent, such as a silane-based coupling agent or a titanium-based coupling agent, may be used for surface treatment of the above fillers and reinforcing agents. The coupling agents described above are suitable.

The particular additive, which is incorporated into the particular resin component in this embodiment, is selected from the group of a fluorine-substituted organopolysiloxane, an amino-functional organopolysiloxane, an unsaturated carboxylic acid or carboxylic acid salt, and combinations thereof. In the context of the present invention, with the embodiment described here and with the embodiments described above, it is to be understood that the terminology organopolysiloxane, whether fluorine-substituted, amino-functional, or neither, includes copolymers, i.e., includes organopolysiloxanes that have been copolymerized with organic blocks and/or other chemical compounds. This terminology also encompasses organohydrogenpolysiloxanes as described below.

Although not required, it is possible that the additive in this embodiment is free of hydroxyl functional groups, alkoxy functional groups, and/or epoxy functional groups. As described above, the additive is preferably present in an amount of from 0.001 to 30, more preferably from 0.01 to 5.0, parts by weight based on 100 parts by weight of the resin component, and the additive includes a hydrosilylation reactive group for reaction with the addition-curable material. As with the additive described above, the hydrosilylation reactive group may be an ethylenically unsaturated functional group or a silicon hydride functional group. Either functional group reacts with the addition-curable material.

Where the additive includes the fluorine-substituted organopolysiloxane and the hydrosilylation reactive group includes the ethylenically unsaturated functional group, the fluorine-substituted organopolysiloxane can include a fluorine-substituted organopolysiloxane resin or even a copolymer of organosiloxanes. In the context of the many different organopolysiloxanes possible in the present invention, the terminology organopolysiloxane "resin" generally indicates combinations of M, D, T, and Q structural units according to nomenclature and formulas known in the art, so long as the organopolysiloxane resin includes either a T structural unit, a Q structural unit, or both T and Q structural units. Thus, possible combinations for organopolysiloxane resins include, but are not limited to, DT, MDT, DTQ, MQ, MDQ, MDTQ, DT, and MQ resins. Alternatively, the fluorine-substituted organopolysiloxane can be copolymerized with an organic block selected from the group of polyamide blocks, polyester blocks, polyolefin blocks, fluorine-substituted organic polymer blocks, polyurea blocks, poly(phenylene ether) blocks, syndiotactic polystyrene blocks, and combinations thereof. If the additive includes the fluorine-substituted organopolysiloxane with the ethylenically unsaturated functional group, then in this embodiment, it is preferred that the fluorine-substituted organopolysiloxane include fluorinated hydrocarbon groups selected from the group of 3,3,3-trifluoropropyl; 6,6,6,5,5,4,4,3,3-nonafluorohexyl; and combinations thereof. More preferably, the fluorine-substituted organopolysiloxane includes dimethylvinylsiloxy-terminated methyl 3,3,3-trifluoropropyl siloxane.

Where the additive includes the amino-functional organopolysiloxane and the hydrosilylation reactive group includes the ethylenically unsaturated functional group, the amino-functional organopolysiloxane can include an amino-functional organopolysiloxane resin or even a copolymer of organosiloxanes. Alternatively, the amino-functional organopolysiloxane can be copolymerized with an organic block selected from the group of polyamide blocks, polyester blocks, polyolefin blocks, fluorine-substituted organic polymer blocks, polyurea blocks, poly(phenylene ether) blocks, syndiotactic polystyrene blocks, and combinations thereof. If the additive includes the amino-functional organopolysiloxane with the ethylenically unsaturated functional group, then in this embodiment, it is preferred that the amino-functional organopolysiloxane include an amine-terminated random copolymer of dimethylsiloxane and methylvinylsiloxane.

Where the additive includes the unsaturated carboxylic acid or carboxylic acid salt and hydrosilylation reactive group includes the ethylenically unsaturated functional group, the unsaturated carboxylic acid or carboxylic acid salt can be copolymerized, or grafted, with an unsaturated organic block selected from the group of polyamide blocks, polyester blocks, polysiloxane blocks, polyolefin blocks, fluorine-substituted organic polymer blocks, polyurea blocks, poly(phenylene ether) blocks, syndiotactic polystyrene blocks, and combinations thereof. In this scenario where the unsaturated carboxylic acid or carboxylic acid salt is copolymerized, or grafted, with the organic block, the unsaturation of the organic block is important. If the additive includes the unsaturated carboxylic acid or carboxylic acid salt with the ethylenically unsaturated functional group, then in this embodiment, it is preferred that the unsaturated carboxylic acid or carboxylic acid salt is selected from the group of 10-undecenoic acid, zinc undecylenate, sodium undecylenate, magnesium undecylenate, calcium undecylenate, lithium undecylenate, potassium undecylenate, lead undecylenate, functionalized stearates having unsaturation at the first carbon atom in the chain, functionalized montanates having unsaturation at the first carbon atom in the chain, and combinations thereof. While not intending to be bound by theory, with the unsaturated carboxylic acid or carboxylic acid salt as the additive, it is contemplated that the acid or acid salt permits the additive to effectively anchor to the resin component.

Where the additive includes the fluorine-substituted organopolysiloxane and the hydrosilylation reactive group includes the silicon hydride functional group, the fluorine-substituted organopolysiloxane preferably includes a fluorine-substituted organohydrogenpolysiloxane. The fluorine-substituted organohydrogenpolysiloxane may include a fluorine-substituted organohydrogenpolysiloxane resin or even a copolymer of organohydrogenpolysiloxanes and organopolysiloxanes. Alternatively, the fluorine-substituted organohydrogenpolysiloxane can be copolymerized with an organic block selected from the group of polyamide blocks, polyester blocks, polyolefin blocks, fluorine-substituted organic polymer blocks, polyurea blocks, poly(phenylene ether) blocks, syndiotactic polystyrene blocks, and combinations thereof. If the additive includes the fluorine-substituted organohydrogenpolysiloxane with the silicon hydride functional group, then in this embodiment, it is preferred that the fluorine-substituted organohydrogenpolysiloxane include fluorinated hydrocarbon groups selected from the group of 3,3,3-trifluoropropyl; 6,6,6,5,5,4,4,3,3-nonafluorohexyl; and combinations thereof. More preferably, the fluorine-substituted organohydrogenpolysiloxane includes trimethylsiloxy-terminated poly (methylhydrogensiloxane/methyl-6,6,6,5,5,4,4,3,3-nonafluorohexylsiloxane).

Like the various compositions described above, the composition in this embodiment may also include a compatibilizing agent for compatibilizing the resin component and the additive. Preferably, the compatibilizing agent is an organic segment compounded with the additive where the organic segment is at least partially compatible with the chemical make-up of the resin component. The compatibilizing agents described above are suitable for incorporation into the composition of this embodiment. Similarly, this composition may also include a catalyst like those described above. Generally, suitable catalysts include, but are not limited to, those catalysts selected from the group of hydrosilylation catalysts and activators for free radical initiators.

The composition in this embodiment, including the particular resin component and the particular additive, is preferably incorporated into a composite article that includes at least one substrate in combination with the addition-curable material, preferably a hydrosilylation-curable material. The at least one substrate is formed from this composition, and the addition-curable material, such as a silicone-based elastomer, is disposed on the at least one substrate. The hydrosilylation reactive group of the additive is present at a surface of the at least one substrate for reaction with the addition-curable material to improve adherence of the at least one substrate, formed from this composition, with the addition-curable material. As such, once the addition-curable material is disposed on the at least one substrate, the addition-curable material and the at least one substrate may be cured and bonded together at significantly lower temperatures to make the composite article.

The following examples illustrating the making of the composition and composite article of the subject invention, as presented herein, are intended to illustrate and not limit the invention.

COMPOSITION EXAMPLES

TABLE 1

Compositions of Examples 1-23

| Example | Resin Component | Amount (pbw) | Additive | Amount (pbw) |
|---|---|---|---|---|
| Control | sPS/PA | 100 | None | 0 |
| 1 | sPS/PA | 99 | A-1 | 1 |
| 2 | sPS/PA | 99 | A-2 | 1 |
| 3 | sPS/PA | 99 | A-3 | 1 |
| 4 | sPS/PA | 98 | A-3 | 2 |

TABLE 1-continued

Compositions of Examples 1-23

| Example | Resin Component | Amount (pbw) | Additive | Amount (pbw) |
|---|---|---|---|---|
| 5 | sPS/PA | 99 | A-4 | 1 |
| 6 | sPS/PA | 98 | A-4 | 2 |
| 7 | sPS/PA | 97 | A-4 | 3 |
| 8 | sPS/PA | 99.5 | A-2 | 0.5 |
| 9 | PC | 99 | A-2 | 1 |
| 10 | PBT | 99 | A-2 | 1 |
| 11 | PP | 99.5 | A-2 | 0.5 |
| 12 | PP/GF | 99.5 | A-2 | 0.5 |
| 13 | PP/GF | 99 | A-2 | 1 |
| 14 | sPS | 99.5 | A-2 | 0.5 |
| 15 | sPS | 99 | A-2 | 1 |
| 16 | PC/ABS | 99 | A-4 | 1 |
| 17 | sPS | 99 | A-4 | 1 |
| 18 | PC | 97 | A-3 | 3 |
| 19 | PC/ABS | 97 | A-3 | 3 |
| 20 | PBT | 97 | A-3 | 3 |
| 21 | PP | 97 | A-3 | 3 |
| 22 | PP/GF | 97 | A-3 | 3 |
| 23 | sPS | 97 | A-3 | 3 |

Resin Component "sPS/PA" is a blend of 30% syndiotactic polystyrene and 70% polyamide (specifically Nylon 6,6) that is 30% glass filled and commercially available as Questra® NWA 7030 from The Dow Chemical Company.

Resin Component "PC" is a polycarbonate resin commercially available as Calibre® 200-10 from The Dow Chemical Company.

Resin Component "PBT" is a polybutylene terephthalate commercially available as Valox® 420 from GE Plastics.

Resin Component "PP" is a polypropylene resin commercially available as Dow H701-12 from The Dow Chemical Company.

Resin Component "PP/GF" is a polypropylene resin that is glass filled commercially available as DGF4400.00 from The Dow Chemical Company.

Resin Component "sPS" is a blend of 95% syndiotactic polystyrene and 5% SEBS (styrene ethylbutylene styrene) that is 30% glass filled and commercially available as Questra® WA 212 black from The Dow Chemical Company.

Resin Component "PC/ABS" is a blend of polycarbonate resin and ABS (acrylonitrile-butadiene-styrene) resin commercially available as Emerge PC/ABS 7100 from The Dow Chemical Company.

Additive A-1 is dimethylvinylsiloxy-terminated methyl 3,3,3-trifluoropropyl siloxane having an average of 1.3% vinyl groups and an average viscosity of 1200 cSt at 25° C.

Additive A-2 is trimethylsiloxy-terminated poly(methylhydrogensiloxane/methyl-6,6,6,5,5,4,4,3,3-nonafluorohexylsiloxane) having an average of 28 methylhydrogensiloxane units and 12 methyl-6,6,6,5,5,4,4,3,3-nonafluorohexyl siloxane units per molecule.

Additive A-3 is zinc undecylenate.

Additive A-4 is an amine-terminated random copolymer of dimethylsiloxane and methylvinylsiloxane having a number average molecular weight of 6400 grams/mole and a ratio of dimethylsiloxane units to methylvinylsiloxane units of 1.6.

The compositions of Examples 1-23 were compounded as follows. The additives were co-extruded in a twin screw extruder with the resin components. More specifically, a powdered premix of the additive and the resin component was initially prepared. The powdered premix for each example includes about 10 weight % based on the weight of the total composition and includes all of the additive that is to be utilized in the particular example. Using Example 4 as an example, a premix including 8 parts of the resin component and 2 parts of the additive was prepared. Using Example 7 as a further example, a premix including 7 parts of the resin component and 3 parts of the additive was prepared. Once prepared, the premixes were fed into a 30 mm Werner and Pfleider fully intermeshing co-rotating twin-screw extruder using a gravimetric feeder. The remaining balance of the resin component was then added to the extruder by way of a second gravimetric feeder. When required by the formulation for the composition, glass fiber was added downstream in a secondary feed port. The compounding conditions on the Werner and Pfleider extruder were dictated by the melting point of each resin component and vary between resin components. These compound conditions are generally provided below in Table 2. In its final form, the composition is made, or produced, from the extruder as an extrudate. The extrudate was cooled in the form of strands and comminuted as pellets. The pellets of the composition of each example were dried in an air draft oven.

TABLE 2

Compounding Conditions Based on Type of Resin Component

|  | sPS/PA | PC | PBT | PP | PP/GF | sPS | PC/ABS |
|---|---|---|---|---|---|---|---|
| Barrel Temperatures (° C.) | 258-295 | 231-285 | 230-287 | 182-220 | 180-225 | 260-292 | 230-269 |
| Screw Speed (RPM) | 300 | 200 | 300 | 300 | 300 | 300 | 300 |
| Torque (%) | 61-65 | 72-80 | 61-65 | 53-57 | 54-59 | 67-70 | 69-75 |

Preparation of Substrate by Molding and Composite Article Examples:

Once the compositions, including the resin component and the additive, were appropriately compounded as described above, test plaques were prepared by molding the compositions into 6"×6"×⅛" test plaques using a 90-ton Toyo injection-molding machine. These test plaques are formed from the composition and equate to the substrate of the composite article. Test plaques for the Control Example and for Examples 1-7 where the resin component is sPS/PA are focused on herein. The process and drying conditions are outlined below in Table 3.

TABLE 3

Process & Drying Conditions for Molding Compositions into Substrates

|  | sPS/PA |
|---|---|
| Barrel Temperature (° C.) | 299-315 |
| Mold Temperature (° C.) | 82 |
| Injection Time (s) | 2.5 |
| Cooling Time (s) | 25 |
| Machine Hold Pressure (bar) | 55.2 |
| Backpressure (bar) | 6.9 |
| Screw Speed (RPM) | 120 |
| Drying Time (hrs) | 4 |
| Trying Temp (° C.) | 93 |

The test plaques, i.e., the substrates, of the Control Example and Examples 1-7 were then combined with the three different addition-curable materials described below to form composite articles. Various tests (Peel Adhesion Testing, Lap Shear Adhesion Testing, and Adhesion Durability Testing) were then conducted on the composite articles. These various tests and the associated results are also described below after the description of the various addition-curable materials.

Addition Curable Material No. 1

A two-part hydrosilylation curable test adhesive was prepared for testing adherence of the substrate with the addition-curable material. With the Addition Curable Material No. 1, the SiH:Vi ratio is substantially equal to 1.0. The following components were mixed together to form Part A of the Addition Curable Material No. 1:

(i) 12.6 parts by weight of an organopolysiloxane resin containing $CH_2$=$CH(CH_3)_2SiO_{1/2}$ units, $(CH_3)_3SiO_{1/2}$ units, and $SiO_{4/2}$ units. The mole ratio of the $CH_2$=$CH(CH_3)_2SiO_{1/2}$ units and the $(CH_3)_3SiO_{1/2}$ units combined to the $SiO_{4/2}$ units was 0.7. The organopolysiloxane resin had a weight average molecular weight of 22,000, a polydispersity of 5, and contained 1.8 percent by weight of vinyl groups;

(ii) 44.6 parts by weight of a dimethylvinylsiloxy terminated PDMS having a viscosity of 55 Pa·s at 25° C.;

(iii) 32.2 parts by weight of ground quartz having an average particle size of 5 μm;

(iv) 4.0 parts by weight of a fumed silica treated with a trimethylsilylating agent;

(v) 0.3 parts by weight of a trimethylsiloxy-terminated dimethyl, methyl(propyl(poly(propyleneoxide)hydroxy))siloxane copolymer, having a viscosity of 140 to 190 centiStokes (cSt);

(vi) 0.80 parts by weight of a catalyst containing one percent by weight of a platinum (IV) complex of 1,1-diethenyl-1,1,3,3-tetramethyl disiloxane, 92 percent by weight of a dimethylvinylsiloxy terminated PDMS having a viscosity of 0.5 Pa·s at 25° C., and 7 percent by weight of tetramethyldivinyldisiloxane;

(vii) 2.2 parts of a siloxane diol of the formula (HO)M-D-D(Vi)-M(OH), where M represents a unit of the formula $CH_3SiO_{3/2}$, D represents a unit of the formula $(CH_3)_2SiO_{2/2}$, and D(Vi) represents a unit of the formula $(CH_3)(CH_2$=$CH)SiO_{2/2}$;

(viii) 0.3 parts by weight of aluminum acetylacetonate;

(ix) 0.4 parts by weight of 5% palladium on carbon; and (x) 2.8 parts by weight of a mixture of 12% zinc oxide, 6% carbon black, and 82% dimethylvinylsiloxy-terminated dimethylsiloxane. The mixture has a viscosity of 20 to 60 Pa·s.

The following components were mixed together to form Part B of the Addition Curable Material No. 1:

(i) 12.6 parts by weight of an organopolysiloxane resin containing $CH_2$=$CH(CH_3)_2SiO_{1/2}$ units, $(CH_3)_3SiO_{1/2}$ units, and $SiO_{4/2}$ units. The mole ratio of the $CH_2$=$CH(CH_3)_2SiO_{1/2}$ units and the $(CH_3)_3SiO_{1/2}$ units combined to the $SiO_{4/2}$ units was 0.7. The organopolysiloxane resin had a weight average molecular weight of 22,000, a polydispersity of 5, and contained 1.8 percent by weight (5.5 mole percent) of vinyl groups;

(ii) 44.6 parts by weight of a dimethylvinylsiloxy terminated PDMS having a viscosity of 55 Pa·s at 25° C.;

(iii) 32.2 parts by weight of ground quartz having an average particle size of 5 μm;

(iv) 4.0 parts by weight of a fumed silica treated with a trimethylsilylating agent;

(v) 0.3 parts by weight of a trimethylsiloxy-terminated dimethyl, methyl(propyl(poly(propyleneoxide)hydroxy))siloxane copolymer, having a viscosity of 140 to 190 centiStokes (cSt);

(vi) 4.1 parts by weight of dimethyl, methylhydrogen siloxane with methyl silsesquioxane, said combination having a SiH content of 0.81 wt %; and (vii) 2.2 parts of 3-glycidoxypropyl trimethoxysilane.

Addition Curable Material No. 2 (SiH-Enriched Test Adhesive)

A two-part hydrosilylation curable test adhesive was prepared for testing adherence of the substrate with the addition-curable material. Addition Curable Material No. 2 was prepared as described above for Addition Curable Material No. 1 with the exception of Part B. For Addition Curable Material No. 2, in Part B, 2.2 parts of a poly(methylhydrogensiloxane/methyl-6,6,6,5,5,4,4,3,3-nonafluorohexylsiloxane) having an average of 28 methylhydrogensiloxane units and 12 methyl-6,6,6,5,5,4,4,3,3-nonafluorohexyl siloxane units per molecule were added to 97.8 parts of Part B to prepare the SiH-enriched adhesive.

Addition Curable Material No. 3 (Vinyl-Enriched Test Adhesive)

A two-part hydrosilylation curable test adhesive was prepared for testing adherence of the substrate with the addition-curable material. Addition Curable Material No. 3 was prepared as described above for Addition Curable Material No. 1 with the exception of Part A. For Addition Curable Material No. 3, in Part A, 1.0 part of neopentylglycoldimethacrylate was added to 99 parts of Part A to prepare the Vinyl-enriched adhesive.

As is known generally in the art, all three of the Addition Curable Materials described above are stored separately and are mixed just prior to application to a substrate.

Peel Adhesion Testing

A hot press apparatus including two aluminum plates containing cartridge heaters embedded at one end of each plate, and chilled water cooling lines embedded at the other end was used to prepare and test adhesion of the composite articles. The upper plate is lined with 0.002" thick aluminum foil that is affixed by a spray mount adhesive (3M Shipping Mate™ labeling adhesive). This apparatus gives a linear gradient in temperature that can be adjusted in range by controlling the temperature of the hot and cold ends. Thermocouples embedded in both the upper and lower plates were used to control and measure the thermal gradient. The steady state temperature gradient ranged, for example, from 90° C. to 170° C. along the 3" length of the adhesive peel specimen.

The adhesive peel specimen was constructed by sandwiching a layer of the test adhesive (one of Addition Curable Material Nos. 1-3) between a test plaque, i.e., a substrate, and the upper plate of the apparatus. More specifically, parts A and B of the test adhesives were mixed together and then the test adhesive was first de-aired for 20 minutes at a reduced pressure of 2 mmHg to remove any entrained air in the test adhesive. The test adhesive was then cast onto the test plaque. The dimensions of the test plaques were 3"×1"×0.125" and the test plaques used for the Peel Adhesion Testing varied according the Control Example and Examples 1-7. This construction process effectively produced composite articles correlating to the Control Example, to the compositions and substrates of Examples 1-7, and to Addition Curable Materials Nos. 1-3. At each end of the test plaque, a 0.041" thick copper wire was embedded in the test adhesive to set the thickness of the adhesive. The composite articles were cured in the apparatus for 60 minutes and were then allowed to cool 15 minutes at room temperature by free convection.

Upon cooling, the sample composite article was removed from the hot press apparatus by gently prying away the aluminum foil from the upper plate. The test adhesive was then scored through the aluminum foil to the surface of the substrate to create a 0.5" wide peel strip along the length of the substrate. A crack was then initiated at the adhesive-substrate interface at the cold end of the substrate by cutting through the adhesive to the substrate surface at approximately 45° angle. Adhesion was tested by clamping a 1500 g load onto the aluminum foil-backed peel strip and allowing this load to hang for 15 minutes while the sample composite article was supported by a metal frame. This resulted in a 90° peel test with a peeling force of 1176 N/m. The force was such that when the mode of failure transitions from adhesive failure to fully cohesive failure, the crack is arrested. The distance from a reference edge of the substrate to the point of crack arrest was measured and was converted to the corresponding temperature by a linear regression fit of the digitally recorded thermocouple readings at steady state. This temperature is defined as the threshold cure temperature for onset of cohesive failure ($T_{CF}$). This method gives an uncertainty of 12° C. in $T_{CF}$. The results for $T_{CF}$ are disclosed below in Table 4.

The results in Table 4 disclose the minimum temperature (in ° C.) needed to obtain adhesion in composite articles which are various combinations of the test adhesive (Addition Curable Material Nos. 1-3) and the substrates formed by the compositions of the Control Example and of Examples 1-7, as defined by $T_{CF}$ according to the Peel Adhesion Testing described above.

TABLE 4

$T_{CF}$ for Various Composite Articles

| Composition | Addition Curable Material No. 1 | Addition Curable Material No. 2 | Addition Curable Material No. 3 |
| --- | --- | --- | --- |
| Control Example (sPS/PA + No Additive) | None | None | None |
| Example 1 (sPS/PA + Additive A-1) | None | 122.1 | N/A |
| Example 2 (sPS/PA + Additive A-2) | None | None | 128.2 |
| Example 3 (sPS/PA + Additive A-3) | 145 | 124 | N/A |
| Example 4 (sPS/PA + Additive A-3) | 109 | 100 | N/A |
| Example 5 (sPS/PA + Additive A-4) | None | None | N/A |
| Example 6 (sPS/PA + Additive A-4) | 133 | 114 | N/A |
| Example 7 (sPS/PA + Additive A-4) | 115 | 116 | N/A |

In Table 4 above, the temperature numbers for $T_{CF}$ are in ° C., the terminology "None" indicates that adhesion was not detected at any temperatures less than 170° C., and the terminology "N/A" indicates that the Peel Adhesion Testing was not conducted for that particular sample. The temperature numbers for $T_{CF}$ indicate marked improvement over conventional composite articles where temperatures upwards of 170° C. are commonly required to achieve adhesion between the substrate and the addition curable material. As Examples 5-7 exemplify, it is to be recognized that certain additives of the present invention optimally enhance adhesion at lower temperatures, $T_{CF}$, when the additives are in the composition at, or above, certain amounts (pbw).

Obviously, many modifications and variaons of the present invention are possible in view of the above teachings. The embodiments of the invention specifically illustrated herein are exemplary only and not intended as limitations on scope except as defined in the appended claims. Further, the invention may be practiced otherwise than as specifically described within the scope of the appended claims.

What is claimed is:

1. A composition having improved adherence with an addition-curable material, said composition comprising:
    a resin component that is organic and polymeric and free of ethylenically unsaturated and silicon hydride functional groups; and
    an additive incorporated into said resin component and comprising a fluorine-substituted organopolysiloxane, wherein said additive comprises a hydrosilylation reactive group for reaction with the addition-curable material and wherein said fluorine-substituted organopolysiloxane is copolymerized with an organic block selected from the group of polyamide blocks, polyester blocks, polyolefin blocks, fluorine-substituted organic polymer blocks, polyurea blocks, poly(phenylene ether) blocks, syndiotactic polystyrene blocks, and combinations thereof.

2. A composition as set forth in claim 1 wherein said hydrosilylation reactive group of said additive comprises an ethylenically unsaturated functional group for reaction with the addition-curable material.

3. A composition as set forth in claim 1 wherein said fluorine-substituted organopolysiloxane comprises a copolymer of organosiloxanes.

4. A composition as set forth in claim 1 wherein said fluorine-substituted organopolysiloxane includes fluorinated hydrocarbon groups selected from the group of 3,3,3-trifluoropropyl; 6,6,6,5,5,4,4,3,3-nonafluorohexyl; and combinations thereof.

5. A composition as set forth in claim 1 wherein said fluorine-substituted organopolysiloxane comprises dimethylvinylsiloxy-terminated methyl 3,3,3-trifluoropropyl siloxane.

6. A composition as set forth in claim 1 wherein said hydrosilylation reactive group of said additive comprises a silicon hydride functional group for reaction with the addition-curable material.

7. A composition as set forth in claim 6 wherein said fluorine-substituted organopolysiloxane comprises a fluorine-substituted organohydrogenpolysiloxane.

8. A composition as set forth in claim 7 wherein said fluorine-substituted organohydrogenpolysiloxane comprises a copolymer of organohydrogenpolysiloxanes and organopolysiloxanes.

9. A composition as set forth in claim 7 wherein said fluorine-substituted organohydrogenpolysiloxane includes fluorinated hydrocarbon groups selected from the group of 3,3,3-trifluoropropyl; 6,6,6,5,5,4,4,3,3-nonafluorohexyl; and combinations thereof.

10. A composition as set forth in claim 7 wherein said fluorine-substituted organohydrogenpolysiloxane comprises trimethylsiloxy-terminated poly (methylhydrogensiloxane/methyl-6,6,6,5,5,4,4,3,3-nonafluorohexylsiloxane).

11. A composition as set forth in claim 1 further comprising a compatibilizing agent for compatibilizing said resin component and said additive, wherein said compatibilizing agent comprises an organic segment compounded with said additive.

12. A composition as set forth in claim 1 further comprising a catalyst selected from the group of hydrosilylation catalysts, activators for free radical initiators, and combinations thereof.

13. A composition as set forth in claim 1 wherein said additive is present in an amount of from 0.001 to 30 parts by weight based on 100 parts by weight of said resin component.

14. A composition as set forth in claim 1 wherein said resin component is further defined as a polymer derived from a monomer or monomers selected from the group of styrene, substituted styrenes, diamines, diacids, lactams, diols, olefin, substituted olefin, dienes, diisocyanate, epoxide, phenol, substituted phenols, ketones, substituted ketones, aldehydes, substituted aldehydes, acrylates, methacrylates, acrylic acid, fumaric acid, maleic acid, maleic anhydride, carbon dioxide, and combinations thereof.

15. A composition as set forth in claim 1 wherein said resin component is further defined as a polymer selected from the group of polystyrenes, polyamides, polycarbonates, polyolefins, styrene acrylonitriles, acrylonitrile-butadiene-styrenes, polyesters, polyurethanes, epoxies, polyphenylene oxides, halogen-substituted organic polymers, polyphthalamides, polyphenylene sulfides, liquid crystalline polymer, polycyclohexaneterephthalates, and combinations thereof.

16. A composition as set forth in claim 1 wherein said resin component is selected from the group of atactic polystyrene, isotactic polystyrene, syndiotactic polystyrene, nylon 6, nylon 6,6, polyethylene terephthalate, polybutylene terephthalate, polyethylene, polypropylene, polytetrafluoroethylene, cyanate esters, bismaleimide triazine, and combinations thereof.

17. A composite article comprising:
    at least one substrate formed from a composition having improved adherence with an addition-curable material and comprising;
        a resin component that is organic and polymeric and free of ethylenically unsaturated and silicon hydride functional groups, and
        an additive incorporated into said resin component and selected from the group of a fluorine-substituted organopolysiloxane, an amino-functional organopolysiloxane, an unsaturated carboxylic acid or carboxylic acid salt, and combinations thereof, wherein said additive comprises a hydrosilylation reactive group for reaction with the addition-curable material; and
    said addition-curable material is disposed on said at least one substrate.

18. A composite article as set forth in claim 17 wherein said additive comprises said amino-functional organopolysiloxane.

19. A composite article as set forth in claim 18 wherein said amino-functional organopolysiloxane comprises a copolymer of organosiloxanes.

20. A composite article composition as set forth in claim 18 wherein said amino-functional organopolysiloxane is copolymerized with an organic block selected from the group of polyamide blocks, polyester blocks, polyolefin blocks, fluorine-substituted organic polymer blocks, polyurea blocks, poly(phenylene ether) blocks, syndiotactic polystyrene blocks, and combinations thereof.

21. A composite article as set forth in claim 18 wherein said amino-functional organopolysiloxane comprises an amine-terminated random copolymer of dimethylsiloxane and methylvinylsiloxane.

22. A composite article as set forth in claim 17 wherein said additive comprises said unsaturated carboxylic acid or carboxylic acid salt.

23. A composite article as set forth in claim 22 wherein said unsaturated carboxylic acid or carboxylic acid salt is copolymerized or grafted with an unsaturated organic block selected from the group of polyamide blocks, polyester blocks, polysiloxane blocks, polyolefin blocks, fluorine-substituted organic polymer blocks, polyurea blocks, poly(phenylene ether) blocks, syndiotactic polystyrene blocks, and combinations thereof.

24. A composite article as set forth in claim 22 wherein said unsaturated carboxylic acid or carboxylic acid salt is selected from the group of 10-undecenoic acid, zinc undecylenate, sodium undecylenate, magnesium undecylenate, calcium undecylenate, lithium undecylenate, potassium undecylenate, lead undecylenate, functionalized stearates having unsaturation at the first carbon atom in the chain, functionalized montanates having unsaturation at the first carbon atom in the chain, and combinations thereof.

25. A composite article as set forth in claim 17 wherein said addition-curable material comprises a hydrosilylation-curable material.

26. A composite article as set forth in claim 17 wherein said additive comprises said fluorine-substituted organopolysiloxane.

27. A composite article as set forth in claim 26 wherein said fluorine-substituted organopolysiloxane comprises a copolymer of organosiloxanes.

28. A composite article as set forth in claim 26 wherein said fluorine-substituted organopolysiloxane is copolymerized with an organic block selected from the group of polyamide blocks, polyester blocks, polyolefin blocks, fluorine-substituted organic polymer blocks, polyurea blocks, poly(phenylene ether) blocks, syndiotactic polystyrene blocks, and combinations thereof.

29. A composite article as set forth in claim 26 wherein said fluorine-substituted organopolysiloxane includes fluorinated hydrocarbon groups selected from the group of 3,3,3-trifluoropropyl; 6,6,6,5,5,4,4,3,3-nonafluorohexyl; and combinations thereof.

30. A composite article as set forth in claim 26 wherein said fluorine-substituted organopolysiloxane comprises dimethylvinylsiloxy-terminated methyl 3,3,3-trifluoropropyl siloxane.

31. A composite article as set forth in claim 26 wherein said fluorine-substituted organopolysiloxane comprises a fluorine-substituted organohydrogenpolysiloxane.

32. A composite article as set forth in claim 31 wherein said fluorine-substituted organohydrogenpolysiloxane comprises a copolymer of organohydrogenpolysiloxanes and organopolysiloxanes.

33. A composite article as set forth in claim 31 wherein said fluorine-substituted organohydrogenpolysiloxane includes fluorinated hydrocarbon groups selected from the group of 3,3,3-trifluoropropyl; 6,6,6,5,5,4,4,3,3-nonafluorohexyl; and combinations thereof.

34. A composite article as set forth in claim 31 wherein said fluorine-substituted organohydrogenpolysiloxane comprises trimethylsiloxy-terminated poly (methylhydrogensiloxane/methyl-6,6,6,5,5,4,4,3,3-nonafluorohexylsiloxane).

* * * * *

UNITED STATES PATENT AND TRADEMARK OFFICE
CERTIFICATE OF CORRECTION

| | | |
|---|---|---|
| PATENT NO. | : 7,858,197 B2 | |
| APPLICATION NO. | : 10/585844 | |
| DATED | : December 28, 2010 | |
| INVENTOR(S) | : Dongchan Ahn et al. | |

It is certified that error appears in the above-identified patent and that said Letters Patent is hereby corrected as shown below:

Column 32, line 48, after "article" please delete "composition"

Signed and Sealed this
Nineteenth Day of April, 2011

David J. Kappos
*Director of the United States Patent and Trademark Office*